United States Patent
Wagner et al.

(10) Patent No.: US 7,165,721 B2
(45) Date of Patent: Jan. 23, 2007

(54) NETWORKED DISPOSAL AND SAMPLE PROVISIONING APPARATUS

(75) Inventors: Frederico Wagner, Sao Paulo (BR); Fabio Zsigmond, Valinhos (BR); Geraldo Luiz Yoshikawa, Sao Paulo (BR)

(73) Assignee: Ikan Technologies Inc., Riverside, CT (US)

( * ) Notice: Subject to any disclaimer, the term of this patent is extended or adjusted under 35 U.S.C. 154(b) by 163 days.

(21) Appl. No.: 10/785,381

(22) Filed: Feb. 24, 2004

(65) Prior Publication Data

US 2004/0195308 A1 Oct. 7, 2004

Related U.S. Application Data

(63) Continuation-in-part of application No. 10/684,328, filed on Oct. 13, 2003, now Pat. No. 7,086,592, which is a continuation of application No. 09/929,817, filed on Aug. 14, 2001, now Pat. No. 6,663,004.

(60) Provisional application No. 60/470,138, filed on May 13, 2003, provisional application No. 60/449,462, filed on Feb. 24, 2003.

(51) Int. Cl.
*G06F 19/00* (2006.01)

(52) U.S. Cl. .................... 235/385; 235/462.01

(58) Field of Classification Search .................. 235/385
See application file for complete search history.

(56) References Cited

U.S. PATENT DOCUMENTS

| | | | |
|---|---|---|---|
| 4,636,950 A | 1/1987 | Casewell et al. | |
| 5,478,989 A | 12/1995 | Shepley | |
| 5,532,928 A | 7/1996 | Stanczyk et al. | |
| 5,699,525 A | 12/1997 | Embutsu et al. | |
| 5,712,989 A | 1/1998 | Johnson et al. | |
| 5,841,115 A | 11/1998 | Shepley | |
| 5,914,472 A * | 6/1999 | Foladare et al. | 235/380 |
| 5,960,402 A | 9/1999 | Embutsu et al. | |
| 5,965,858 A | 10/1999 | Suzuki et al. | |
| 5,979,240 A * | 11/1999 | Rix et al. | 73/602 |
| 6,024,281 A | 2/2000 | Shepley | |
| 6,047,843 A * | 4/2000 | Mecke | 220/23.88 |

(Continued)

OTHER PUBLICATIONS

International Search Report; International Appln. No. PCT/IB04/01076; May 25, 2005.

(Continued)

*Primary Examiner*—Steven S. Paik
(74) *Attorney, Agent, or Firm*—Knobbe, Martens, Olson & Bear LLP

(57) ABSTRACT

A waste disposal system comprises a waste disposal unit, including a processor, a scanner, a network interface coupled to a network, and a remote processing system coupled to the waste disposal unit via the network. The remote processing system includes a database storing user sample preferences, wherein the sample preferences are used to select samples to be provided to the user, and instructions configured to receive scanned information from the waste disposal unit for a first item, determine from the received scanned information that the first item is a sample, receive an indication via the waste disposal unit whether the user wants to order a replacement for the sample, locate replacement options for the sample, transmit the replacement options to the waste disposal unit, and receive from the waste disposal unit an option selection by the user.

54 Claims, 19 Drawing Sheets

U.S. PATENT DOCUMENTS

| | | | | |
|---|---|---|---|---|
| 6,131,744 | A | * | 10/2000 | Pratt .......................... 209/540 |
| 6,378,721 | B1 | | 4/2002 | Williams |
| 6,386,386 | B1 | * | 5/2002 | George ....................... 220/526 |
| 6,425,487 | B1 | * | 7/2002 | Emmott et al. ............. 209/703 |
| 6,530,518 | B1 | * | 3/2003 | Krichilsky et al. ......... 235/375 |
| 2002/0016731 | A1 | | 2/2002 | Kupersmit et al. |
| 2002/0059175 | A1 | | 5/2002 | Nakano |
| 2002/0120502 | A1 | | 8/2002 | Sakaguchi |

OTHER PUBLICATIONS

Article: Dietitian/Healthy Eating Services "Tranforming How Dietitions Offer Advice"; AirClic ; 2001-2003.

Article: Shop Smart, Eat Right "Healthier, More Nutritious Meals"; Beeline Shopper; 2001-2003.

Article: Shop Smart, Eat Right—Sample Grocery List "Guide Yourself to Healthier Eating"; Beeline Shopper; 2001-2002.

Article: Shop Smart, Eat Right—Sample Recipes "Great Meals Made Easy"; Beeline Shopper; 2001-2002.

PCT International Search Report dated Feb. 14, 2003.

PCT International Search Report dated Feb. 14, 2003.

\* cited by examiner

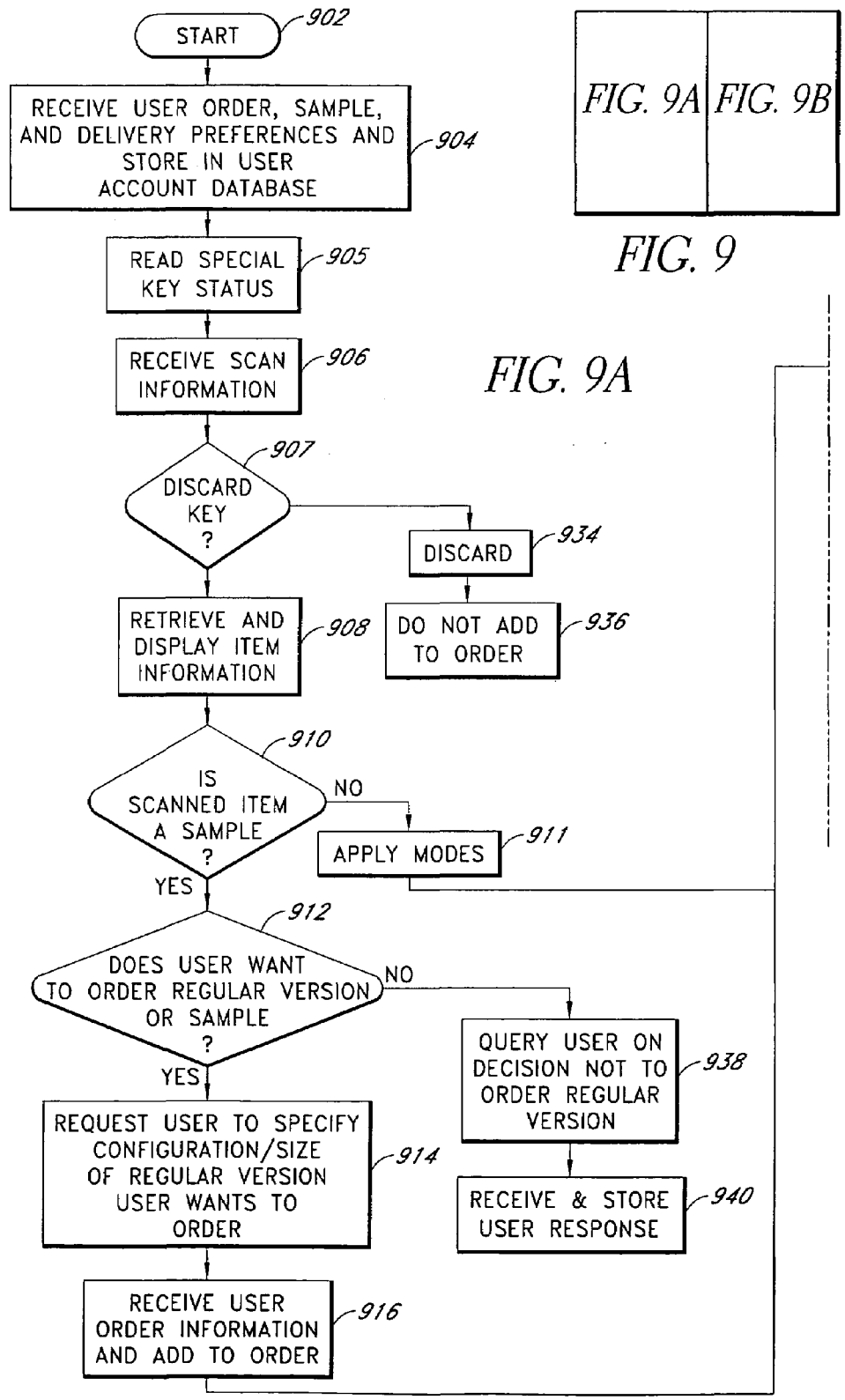

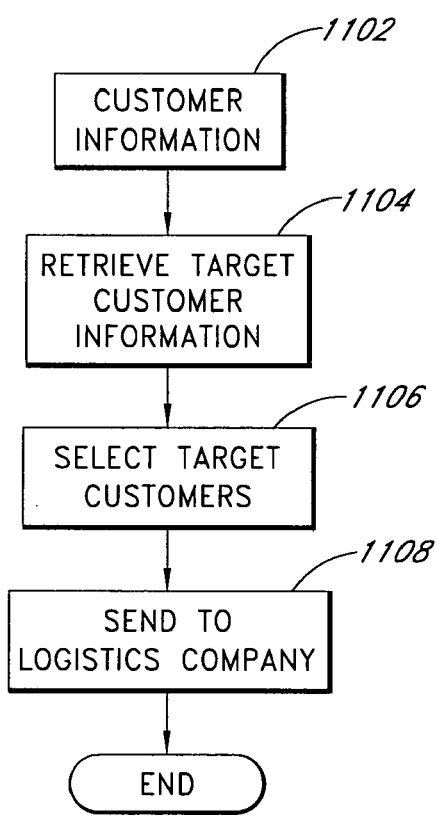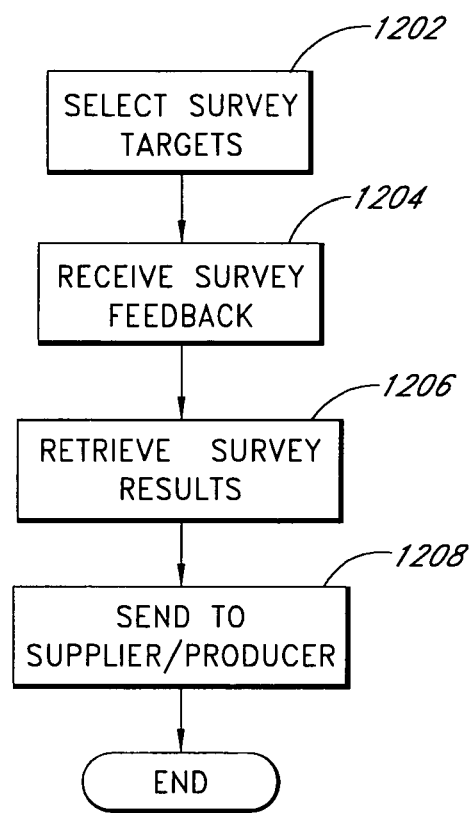
FIG. 11
FIG. 12

- I do not want to receive samples ☐

- I do not want any food products that contain: (please select any of the following that apply)

Pork ☐
  Poultry ☐
  Beef ☐
  Fish ☐
  Seafood ☐

I will only accept vegetarian products ☐
  I will only accept low fat products ☐
  I will only accept low fat products ☐
  I will only accept kosher products ☐

*FIG. 13A*

Add New Rule:

Product category:                Mode:
I want all my [-Yogurt V] products [to be V]  [Diet V]

My Level of Flexibility regarding Product Substitution:

Low ----|-------------- High

Don't change                 Allow any
brand, type,                  kind of change
family or kind              in brand, type,
                                   family or kind

[ ] "Restrictive"

[ ] Apply only this rule to Sampling

[ ] Apply only this rule to this product category

Rating Method: [Gourmet Magazine V]

*FIG. 15*

| Priority | Product category | Mode selected | Restrictive | Flexibility | Description |
|---|---|---|---|---|---|
| 1 | Yogurt | Diet | No | Low | |
| 2 | Yogurt | Organic | No | High | |
| 3 | Grocery | Diet | Yes | High | |
| 4 | Pharmaceuticals | Restriction | Yes | High | Ibuprofen |

*FIG. 16*

Dannon Danimals Drinkable Yogurt Strawberry 4 Pak

Price: $2.39

Size: 3.1 OZ BTL

Brand: DANNON

Type: DRINKABLE YOGURT

Family: DANIMALS

Kind/Flavor: STRAWBERRY

*FIG. 17*

NETWORKED DISPOSAL AND SAMPLE PROVISIONING APPARATUS

PRIORITY CLAIM

This application is a continuation-in-part of U.S. patent application Ser. No. 10/684,328, filed Oct. 13, 2003, now U.S. Pat. No. 7,086,592 which is a continuation of U.S. patent application Ser. No. 09/929,817, filed Aug. 14, 2001, now U.S. Pat. No. 6,663,004, and claims priority from U.S. Patent Application No. 60/449,462, filed Feb. 24, 2003, and from U.S. Patent Application No. 60/470,138, filed May 13, 2003, the contents of which are incorporated herein in their entirety.

RELATED APPLICATION

This application is related to copending application, entitled NETWORKED DISPOSAL AND REPLENISHMENT APPARATUS, application Ser. No. 10/785,932, copending application, entitled NETWORKED DISPOSAL AND INFORMATION DISTRIBUTION APPARATUS, application Ser. No. 10/785,387, and copending application, entitled NETWORKED WASTE PROCESSING APPARATUS, application Ser. No. 10/785,706, all filed on the same date as the present application, the entirety of which are hereby incorporated by reference.

BACKGROUND OF THE INVENTION

1. Field of the Invention

The present invention is related to waste disposal and in particular methods and systems for waste disposal processing and replacement of disposed of items.

2. Description of the Related Art

Because of the world's expanding population, the age-old solution of burying trash is becoming less attractive for many reasons, including for example, the limited availability of disposal sites and the resultant contamination of the environment. In an effort to help alleviate some of the problems associated with discards, recycling has been gaining in popularity. Although recycling helps both by reducing the overall amount of trash and makes more efficient use of natural resources, the pick-up and sorting of the items to be recycles is often inefficient and expensive.

Another consideration of modem trash disposal is that when an item is discarded, it often needs to be replaced. Often, this requires a human operator to take action to ensure that the discarded item is replaced.

SUMMARY OF THE INVENTION

Embodiments of the present invention are related to processing discarded items, processing information related to discarded items, and replacing discarded items.

One embodiment of the present invention advantageously uses consumption to automatically generate shopping orders and select samples, as well to facilitate inventory management, waste disposal and recycling. Embodiments of the present invention can save consumers time, energy, and money.

In one example embodiment, a disposal apparatus scans data stored on item packaging being discarded. The scanned data is processed and used to generate shopping orders, the provisioning of samples, to control inventories, and/or manage waste disposal operations. In particular, order lists are automatically generated based at least in part on the scanned data and on user preferences. Advantageously, the user can modify orders, delivery dates and times. Product samples are likewise provisioned based at least in part on user preferences.

Further, substantially real-time consumption information enables suppliers to predict future consumer orders, thereby enabling suppliers to manage inventories more efficiently, and enabling manufacturers to better plan production. Similarly, substantially real-time disposal information enables waste disposal and recycling operators to better plan waste and recycling pick-ups and processing operations.

One embodiment provides a disposal and provisioning system, comprising: a waste disposal unit, the waste disposal unit including: a processor; a scanner coupled to the processor, the scanner configured to scan a code on items deposited in the waste disposal unit; a network interface coupled to the processor, the network interface configured to transmit and receive information over a network and a remote processing system configured to be coupled to the waste disposal unit via the network. The remote processing system includes: a database storing sample preferences associated with a user of the waste disposal unit, wherein the sample preferences are stored at least in part to select samples to be provided to the user; a first instruction configured to receive scanned information from the waste disposal unit for at least a first item; a second instruction configured to determine from the received scanned information that the first item is a sample; a third instruction configured to receive an indication via the waste disposal unit whether the user wants to order a replacement for the sample; a fourth instruction configured to locate replacement options for the sample; a fifth instruction configured to transmit the replacement options to the waste disposal unit; and a sixth instruction configured to receive from the waste disposal unit an option selection by the user.

Another embodiment provides a method of selectively providing samples, comprising: receiving over a network user specified sample preferences from a first user; storing the sample preferences in a user database; receiving from a networked waste receptacle discard information related to at least a first item package disposed of by the user; and causing a first sample to be delivered to the user based at least in part on the sample preferences and the discard information.

Still another embodiment provides a method of selectively providing samples, comprising: receiving user specified sample preferences from a first user over a network; storing the preferences in a database; and causing a first sample that satisfies the user specified sample preferences to be delivered to the first user.

Another embodiment provides a disposal data processing and provisioning system, comprising: a database storing sample preferences associated with a user of at least a first waste disposal unit; a processing system configured to be coupled to at least the first waste disposal unit via the network, the processing system including: a first instruction stored in computer readable memory configured to receive information from the waste disposal unit for at least a first item; a second instruction stored in computer readable memory configured to determine from the received scanned information that the first item is a sample; and a third instruction stored in computer readable memory configured to receive an indication via the waste disposal unit whether the user wants to order a non-sample version for the first item.

Yet another embodiment provides a method of selectively providing samples, comprising: receiving over a network user specified sample preferences from a first user; storing the sample preferences in a user database; receiving from a networked waste receptacle discard information related to at least a first item package disposed of by the user; and causing a first sample to be delivered to the user based at least in part on the sample preferences and the discard information.

BRIEF DESCRIPTION OF THE DRAWINGS

Embodiments of the present invention are described herein with reference to the drawings summarized below. These drawings and the associated description are provided to illustrate example embodiments of the invention, and not to limit the scope of the invention.

A more complete understanding of the present invention, and the attendant advantages and features thereof, will be more readily understood by reference to the following detailed description when considered in conjunction with the accompanying drawings wherein.

FIG. 11 illustrates an example process for selecting users to received samples.

FIG. 12 illustrates an example process of collecting and distributing sample feedback information.

FIG. 13A illustrates an example sample preference form.

FIG. 15 illustrates an example mode rule form

FIG. 16 illustrates an example mode selection form

FIG. 17 illustrates an example product record.

DETAILED DESCRIPTION OF PREFERRED EMBODIMENTS

Embodiments of the present invention are related to processing discarded items, processing information related to discarded items, and replacing discarded items.

Throughout the following description, the term "Web site" is used to refer to a user-accessible network site that implements the basic World Wide Web standards for the coding and transmission of hypertextual documents. These standards currently include HTML (the Hypertext Markup Language), HTTP (the Hypertext Transfer Protocol), Java, and XML. It should be understood that the term "site" is not intended to imply a single geographic location, as a Web or other network site can, for example, comprise multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. However, the present invention can also be implemented using special purpose computers, state machines, and/or hardwired electronic circuits.

As will be described below, in one example embodiment, a disposal unit scans data stored on item packaging being discarded. The scanned data is processed and used to generate shopping orders, the provisioning of samples, to control inventories, and/or manage waste disposal operations. In particular, shopping order lists are automatically generated based at least in part on the scanned data and on user preferences. Advantageously, the users can modify orders and the time frame for delivery schedules. In one embodiment, product samples are likewise provisioned based at least in part on user preferences.

Further, real-time consumption information enables suppliers to predict future consumer orders, thereby enabling suppliers to manage inventories more efficiently, and enabling manufacturers to better plan production. Similarly, real-time disposal information enables waste disposal and recycling operators to better plan waste and recycling pick-ups and processing operations.

Figure 1:
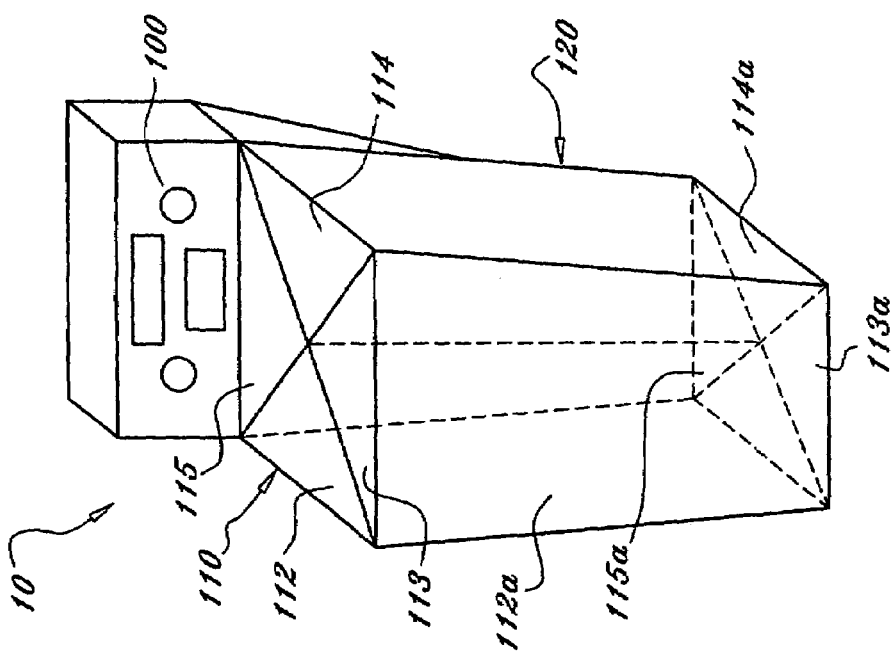
FIG. 1 is a perspective drawing of an electronic trash unit according to an embodiment of the invention.

Referring to FIG. 1, an electronic trash disposal unit 10 includes a storage area 120, a controllable lid 110 which is moveably connected to cover the storage area 120 and a control panel 100 which is positioned on top of the controllable lid 110 including one or more sub-lids. Optionally the lid 110 can be motorized under control of CPU 400 illustrated in FIG. 4. Storage area 120 can take the form of any suitable shape (for example, cylindrical, rectangular, square, etc.). In the embodiment shown, trash is deposited in the proper container using gravity. As illustrated, the controllable lid 110 includes 4 sub-lids for correspondingly covering four separate openings 112, 113, 114 and 115 of four separate storage bins 112a, 113a, 114a and 115a which correspond to the openings 112, 113, 114 and 115, respectively. In the closed position, these sub-lids work together to provide a temporary holding shelf where a trash item to be discarded (not shown) may be placed. The trash item to be discarded is placed so that a scanning device 140 located on the control panel 100 can electronically read a code such as a barcode located on the trash item. The trash item is identified and the proper opening is activated allowing the trash item placed on the controllable lid 110 to fall into the proper storage bin (112a, 113a, 114a and 115a) in storage area 120. The storage bins (112a, 113a, 114a and 115a) as well as the storage area 120 may be constructed of metal and fabricated using known methods of construction, or may be constructed out of a polymer or composite material.

Each of the storage bins (112a, 113a, 114a and 115a) may contain a removable liner (not shown) to facilitate emptying of the unit 10. The liner may be disposable and remain with the discarded trash or it may be a reusable liner that may be emptied into a larger depository and returned to the unit 10. The liners may be made in different colors to indicate the kind of recyclables present therein. It should be apparent to those skilled in the art that other means of sorting and storing trash would be suitable and are considered to be within the scope of this disclosure such as using a conveyor belt system to transport the trash items identified in the manner disclosed above to the storage area 120. Also, although four openings are shown (112, 113, 114 and 115), more or fewer openings may be utilized without departing from the spirit of the present invention.

Figure 3:
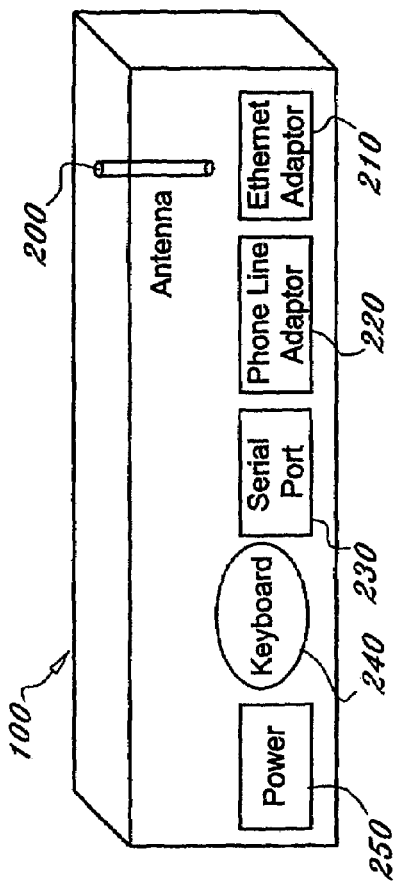
FIG. 3 is a rear view of the back of the control panel shown in FIG. 2.
Figure 2:
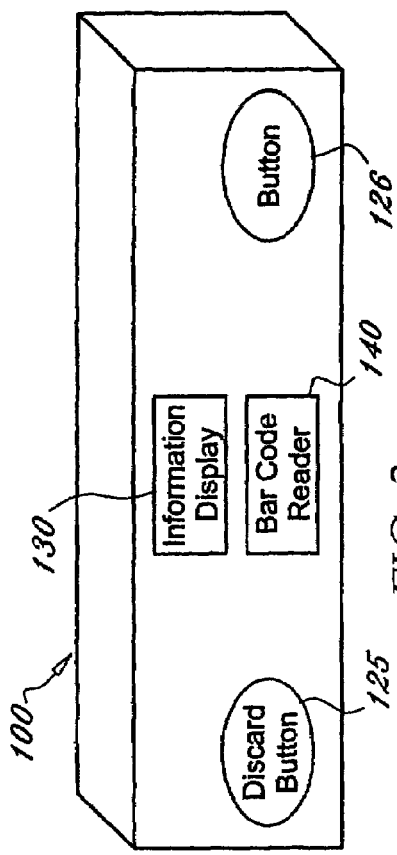
FIG. 2 is a front view of the control panel shown in FIG. 1.
Figure 4:
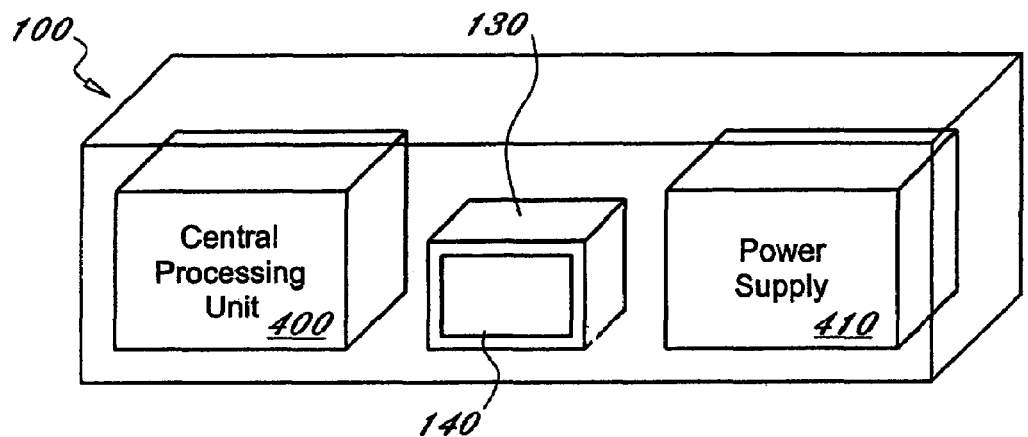
FIG. 4 is a view of the internal components of the control panel according to an embodiment of the invention.

The control panel 100 is described with references to FIGS. 2–4. As shown, the control panel 100 is arranged to provide an easy to operate user interface for the trash unit 10. The control panel 100 includes an information display 130 which displays information about the trash item discarded in accordance with the present invention. Examples of the kind of information displayable include detailed descriptions about the item, cost to replace the item, title of the item, identification code, product advertisement, as well as other information that might be useful to the user. The displayed information may be customized to suit the individual needs of the user. The displayable information may be stored in a database that resides within the unit 10 or may be accessed from a remote database using a communication network such as the Internet.

Although the display 130 is depicted as a visual display, it is within the scope of this disclosure to use any suitable means to communicate the desired information to the user such as a speech synthesis output device. Thus, for example, one embodiment of the trash unit 10 includes a control panel interface such as described with respect to control panel 100 and/or a voice command and output interface, whereby a user can provide oral instructions to the unit 10 and the unit can provide feedback and information using an audio signal. Optionally, the display 130 can be a touch screen display, via which users inputs can be provided.

In an embodiment of the invention, a discard button 125 is used to initiate the control command that scans the trash item. Other methods could be used such as a pressure activated switch located on the controllable lid 110 that automatically starts the scan process when the trash item is placed thereon. Optionally, in addition to or in place of the discard button 125, a motion or presence sensor circuit can be included. As a person or object approaches or comes near the unit, the scanner is activated and starts functioning in response to the sensor detecting the presence of the person or object. Optionally, a user may be asked to enter a password before the scanning will be performed to thereby prevent a child or other unauthorized person for using the system.

Other user functions may be incorporated as needed and are representatively illustrated as button 126. Button 126 may be a software programmable button which is user configured to customize the unit 10 or it may be a function specific input such as an over-ride switch. A barcode or RFID scanner 140 is positioned to scan the trash item placed on the controllable lid 110 to identify the item using a machine scanable code affixed thereon. The code may be affixed from the manufacturer or it may be applied by the user of the present invention. Other electronic identification apparatus and processes can be used. For example an optical laser scanner can be used to scan the item packaging and/or labeling to identify the item. Alternatively or in addition, a magnetically encoded label can be included on the item which is scanned by a corresponding magnetic scanner included in the unit.

The control unit 100 may also have a variety of interface components as needed by particular applications. In an embodiment, the control unit 100 includes a keyboard port 240, a serial port 230, a phone line adapter 220, and a network adapter such as an Ethernet adapter 210. A keyboard (not shown) may be used to enter alphanumeric information into the control unit 100 such as item codes or discard instructions. The keyboard can also be directly included on the control panel 100. The serial port 230, may be used to connect a variety of external peripherals, such as, but not limited to, personal digital assistant (PDA), printers, backup drives, etc. Such devices are known in the art and the present invention allows users to utilize appropriate technology to interface with the control unit 100 to best suite the need of the user. For example, a tape or solid state backup drive can be plugged into the serial port 230 to make a nightly backup of the day's activity of the unit 10 or a user can connect a PDA or personal computer to the control unit 100 using the appropriate interface (i.e., serial port 230 or network adapter 210, etc.) for downloading the contents of the unit 10 into the PDA or personal computer.

The trash unit can include other interfaces, such as a parallel port, a FireWire port, a USB port, a USB2 port, pointing device inputs among other input/output interfaces as are known in the art. In addition to standard telephone inputs such as the phone line adapter 220, a wireless communication link may be used to communicate with a communications network (i.e., the Internet) using an antenna 200. The antenna 200 may also be placed inside the control unit 100. A power button 250 is provided to control power to the electronics included in the control unit 100.

to the control unit 100 is a CPU 400, associated memory 414, and other components which allow the CPU 400 to operate as a computer as is known in the art. The memory 414 can include volatile memory and/or non-volatile memory that store program code and data, wherein the program codes is executed by the CPU 400 to process data and control the operation of the trash unit, including the scanner 140, lid 110, network interface 210, control panel 100, and other trash unit devices. By way example, the non-volatile memory can include fixed or removable solid state FLASH memory, a magnetic disk drive, and/or an optical disk drive. The volatile memory can include RAM.

The CPU 400 may be permanently connected to a communications network or may initiate a connection as needed. The connectivity of the unit 10 will be discussed in more detail below. A power supply 410 is used to power the trash unit 10. The power supply 410 can receive its power from an AC line, or can be battery or solar powered.

Figure 5:
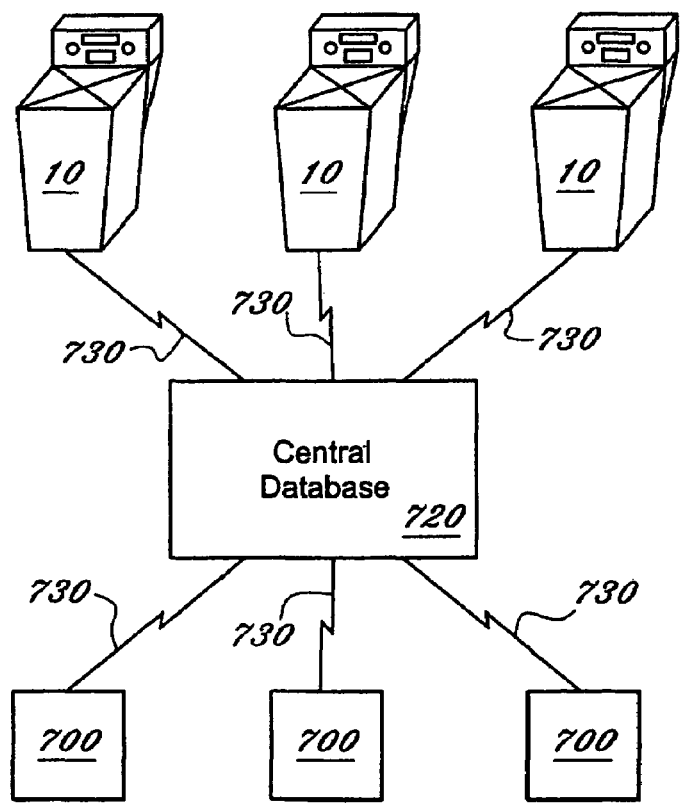
FIG. 5 is a block diagram of an electronic trash network according to an embodiment of the invention.

Now referring to FIGS. 2, 3 and 5, a communication network 730 such as the Internet is used to provide connectivity of each unit 10 with one or more central databases 720 that keep track of the disposed contents in each unit 10. The communication network 730 may be accessed using the network adapter 210 or by connecting the control unit 100 to a modem (not shown) using the phone line adapter 220 or through a wireless connection using an internal modem (not shown) coupled to the antenna 200 as is known in the art. The connection can be via a broadband connection, such as a digital subscriber line (DSL), a T1 line, a satellite link, and/or a cable hookup, which are sometimes referred to as "always on" connections. Dial-up modems plugged in a phone line or networked connections such as wide area networks (LAN or WAN) may be utilized to provide the needed connectivity.

Suppliers, market researchers, recycling companies, and other interested parties 700 also connect using the communication network 730 to access information contained in the central database 720. Each trash unit 10 sends its information which includes the type and amount of trash stored in each bin (112*a*, 113*a*, 114*a* and 115*a*). Either the user or a third-party contractor 700 may be notified when it is time to empty the bins by a message being transmitted from the central database 720 using the communication network 730 or the user may be notified of the need to empty the bins by a notification message appearing on the information display 130 located on the control unit 100. Other methods of notification, such as an indicator light (not shown) mounted on the control unit 100 or on the controllable lid 110 can be used. In the embodiment which relies on notification from the central database 720 to inform the interested party (either the user or third-party contractor such as a recycling company) of the need to empty the bin, a communication (such as an e-mail, telephone or data message) may be sent back to the CPU 400 in the control unit 100. The information may be displayed on the information display 130. The choice of the method used to deliver emptying instructions may be selected by the user to best suit the application.

In operation, the trash item is temporarily placed on the controllable lid 110 so that the barcode reader 140 can scan the item for an identification code. Most products today have a scanable code affixed thereon but the process for dealing with code-less and unrecognizable items is discussed below. The barcode reader 140 identifies the discarded item by referring to an identification database (not shown) which is accessible by the CPU 400. The identification database can physically reside within the trash unit 10 or it may be accessible by the CPU 400 through the communication network 730. A user presses the discard button 125 to initiate the process of scanning and identifying the item. In addition or alternatively, a motion or presence sensor can detect the presence of a person or object and at least partly in response, the unit initiates the identification and scanning process. Once the item is identified, the relevant information is displayed on display 130 such as a description, title, recorder code or price of the replacement. If the user wishes to reorder the item being discarded, an order is initiated in accordance to predefined ordering instructions. The reordering process can take place automatically, that is whenever a recognized item is disposed using the unit 10, the CPU generates and transmits a reorder instruction to a selected supplier. The central database receives and stores the scanned discarded item information from each user. Optionally, a central computing system coupled to the central database generates orders according to users preferences. The user preferences can be entered by the user via an online Web page, by phone, by fax, and/or through the trash unit touch screen display, keyboard, or otherwise. Thus, in one embodiment, orders will optionally not be sent directly to suppliers and/or the orders will not be generated by the trash disposal unit. In an embodiment, optionally orders will be generated and sent directly to suppliers by the trash disposal unit via the Internet or other network. In either case, reordering is automatically accomplished.

In another embodiment, the user is given the opportunity to confirm the desire to reorder the discarded item. The user's choice may be inputted into the control unit 100 using any suitable input method such as pressing the "soft button" 126 presented on the touch screen display when instructed to do so by an instruction displayed on the information display 130, pressing a key on a keyboard (not shown) or by speaking if a voice recognition input is implemented as is known in the art. In one embodiment, the unit 10 transmits information regarding a discarded item being disposed in a unit 10 to a central reordering site such as a purchasing officer's workstation (not shown) and allows the reordering decisions to be centralized rather than individually made at the local unit 10 level. Once an identification is made, the proper storage bin (112*a*, 113*a*, 114*a* and 115*a*) is selected to store the item. The proper bin opening (112, 113, 114 and 115) is opened and the item falls into the selected storage bin. The central database 720 is informed of the location of the trash item. The proper storage bin is selected according to recycling guidelines which can be customized depending on the geographic location of the user and the recycling options available. Examples include a simple recycling scheme would include separating the trash into glass, plastic, metal and all else. A more elaborate scheme may be used to suit the individual needs of the user such as separating different color glass or different kinds of plastic, etc.

Some items like discarded organic or packing materials are not identifiable by the unit 10 and the user may simply wish to discard them without identifying or reordering. They may be simply discarded using a bypass means such as by pressing the "soft button" 126 if the button is so programmed. Of course, any other input means to indicate the discard choice would be acceptable as discussed above. Non-recyclable items may be stored in an appropriate bin. Items that are recyclable but not reordered are still identified so as to be placed in the proper bin and to update the central database 720 with the contents of the unit 10.

The initial programming of unit 10 is provided by the manufacturer of the unit 10. The manufacturer may offer different options such a providing a unit 10 that only has a wireless interface for connecting with the communication network 730 or may provide a "standard" unit 10 that includes most of the common options with the user using the unit 10 in a way that makes sense in the context of the user's application. Another embodiment includes a user programmable unit 10 that may be customized by the user. It is anticipated that an operating system would be built into the CPU 400 along with a user specific program interface that would allow the user to select various options from a menu presented. In another embodiment, a large user of the present invention could specify the functionality desired and the manufacturer would program the specific requirements into the individual units 10. Some units 10 could be programmed to meet different needs (i.e., some units 10 may have a voice recognition input while others use a keyboard) and yet communicate and work together over the communication network 730 to perform the required functions as a whole.

Figure 6:
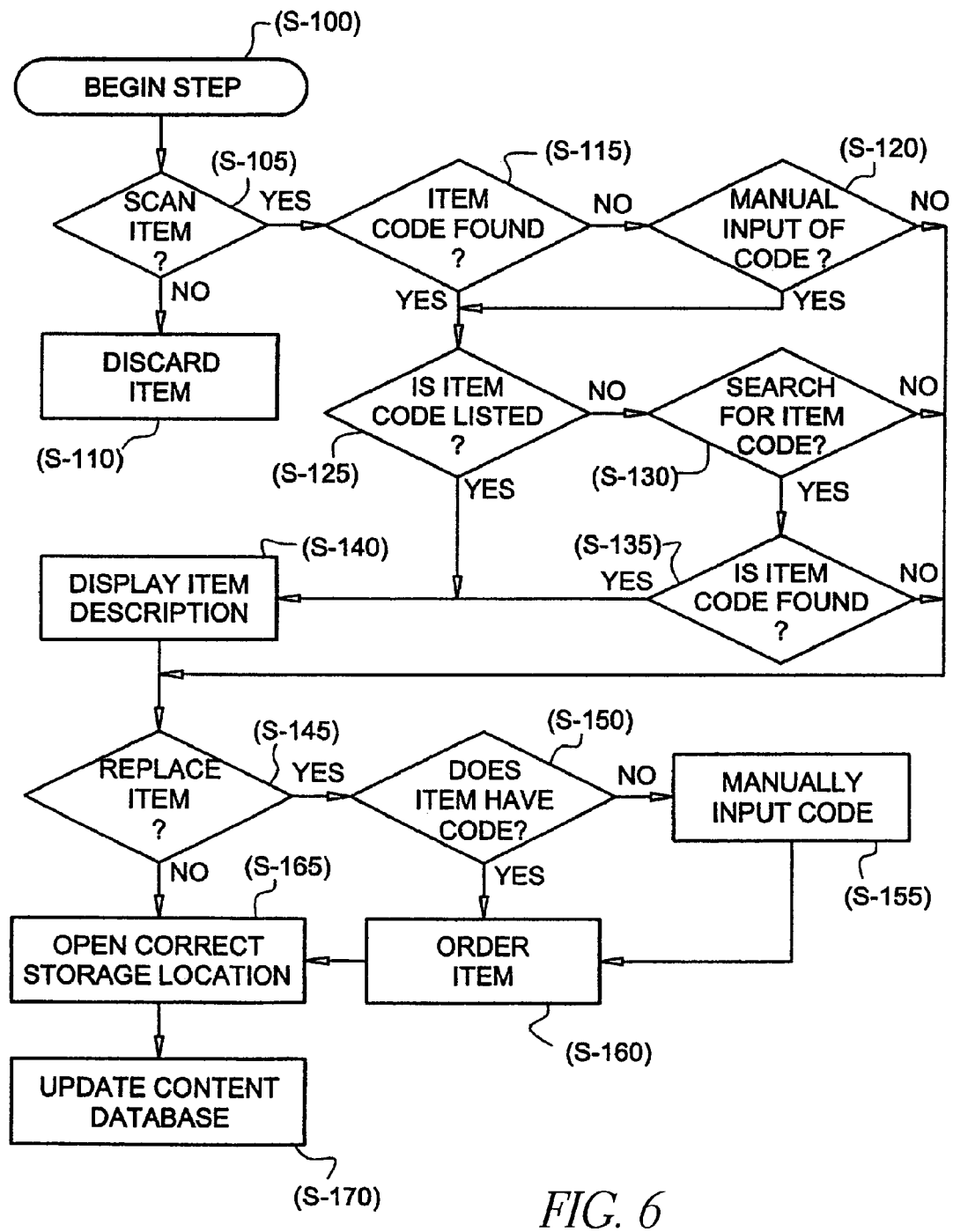
FIG. 6 is a flow chart of a detailed process of disposing of trash according to an embodiment of the invention.

A method of the use an apparatus of one or units 10 is described with reference to FIG. 6, a flow chart of the method of disposing of trash according to the present invention. Initially, a trash item is placed on controllable lid 110 (step S-100). The user is presented with a bypass (step S-105) to deal with the case of unidentifiable or non-scanable items. Items selected for bypass are simply discarded (step S-110). Items so discarded are placed in a general storage bin. If the bypass (step S-105) is not selected, the item is scanned to see if a code is detectable (step S-115). If no code is found, the user is given an opportunity to manually input a code (step S-120). If the item code is located (step S-115) or manually inputted (step S-120), the code may be manually inputted using a suitable input device such as voice recognition or keyboard as discussed above), the code is compared using an identification database (step S-125). If a matching code is found in the database, information such as title, price to replace or reordering code, etc. is displayed on the display 140 (step S-140) allowing the user to decide whether or not to replace and reorder the item (step S-145). If no matching code is found (step S-125), the unit may optionally search using the communication network 730 (step S-130) and, if found, the information is displayed as discussed above. If no code is located (step S-135), the user is still given the opportunity to reorder the item (step S-145), however, no information will be displayed and a code will have to be manually entered if not previously done (steps S-150 and S-155). A reorder instruction is generated and transmitted to the proper supplier (step S-160). In one embodiment, the reorder instruction is generated by the CPU 400 according to the programming provided and customized by the user as discussed above. The reorder instruction may be printed out and sent by mail to a supplier or may be transmitted electronically to the supplier. However, as described above, optionally the order is generated and transmitted by the central computer system, rather than the trash disposal unit. Next, the proper bin opening (112, 113, 114 and 115) is selected (step S-165) and the content database is updated to keep a record of the items stored therein (step S-170). As discussed above, the proper bin is selected by referring to the local recycling rules programmed into the CPU 400 or by the generic rules programmed by the manufacturer.

Users of the trash units 10 may customize each unit to meet specific needs of the user. Examples of the preferences users may specify include reordering periods such as weekly, monthly or when the total value of the reorder equals or exceeds a certain level. Other customizable preferences include which supplier or suppliers to use, which may be further customized by best price, specific supplier for a specific consumable, method of payments such as credit card, billing, check, etc., which recycling company or companies to use, etc. Because the trash units 10 are customizable, the user experiences great flexibility when implementing the present invention. The user benefits by using the trash units 10 by allowing automated replacement of consumables and automated separation of recyclable materials. Because of the use of trash units 10 reorders consumables as specified by the user, inventories may be reduced leading to enhanced productivity on the part of the user. If the trash units 10 are used in a home setting, the user spends less time in the supermarket since a list of used consumables is constantly available. The "grocery list" can be generated by the trash unit 10. Additionally, because of the ease and automated handling of recyclables, the user may be able to benefit financially from the resale of the recycling materials sorted by the unit 10. Also, all of the system and transaction information, such as reordering period, reordering levels, suppliers, billing information, order history, order status, user account information, recycling options, credits and the like, can be made available to users over the Internet.

The role of the central database 720 in the function of the trash units 10 is to store detailed lists of the contents of each unit 10 linked to the database 720. Additionally, the central database 720 stores the user preferences discussed above such as how often to reorder, who to reorder from, the best price to pay, etc. Also, the central database functions to authorize credit transactions between users, suppliers and other third-parties such as recycling and market research companies. The central database may also send confirmations of orders or emptying instructions as discussed above. These instructions and confirmations can be sent by e-mail, "regular mail" or fax. Another role of the central database 720 is that of statistic gatherer enabling the user to better anticipate their future needs and trends.

Suppliers in the resupply process benefit by optionally receiving automatic reorders which enhances customer loyalty. Credit may be preauthorized reducing the risk of write-offs. Suppliers also benefit by the statistical data generated by the central database 720 which allows the supplier to reduce the inventory required to meet the customer's needs. Written confirmations or orders are sent by the central database 720 providing a written contract to facilitate good business relations.

Participating recycling companies benefit by having a steady source of recyclables, which can optionally be separated using a trash disposal unit with multiple chambers without having to deal with intermediaries which drives up the cost. Credits for materials received from users can be credited through the central database 10, thereby streamlining operations. Additionally, many users will wish to contract with the recycling companies directly to empty the units 10 automatically, thereby increasing revenues for the recycling companies.

Other third parties such as marketing research companies benefit by having a detailed list of the disposed items in each unit 10. This will allow research into ways to decrease supplier and user waste and to study consumer behavior. Additionally, research may be done on ways to develop more environmental packaging, especially in regard to high volume items as identified by the present invention.

Figure 7:
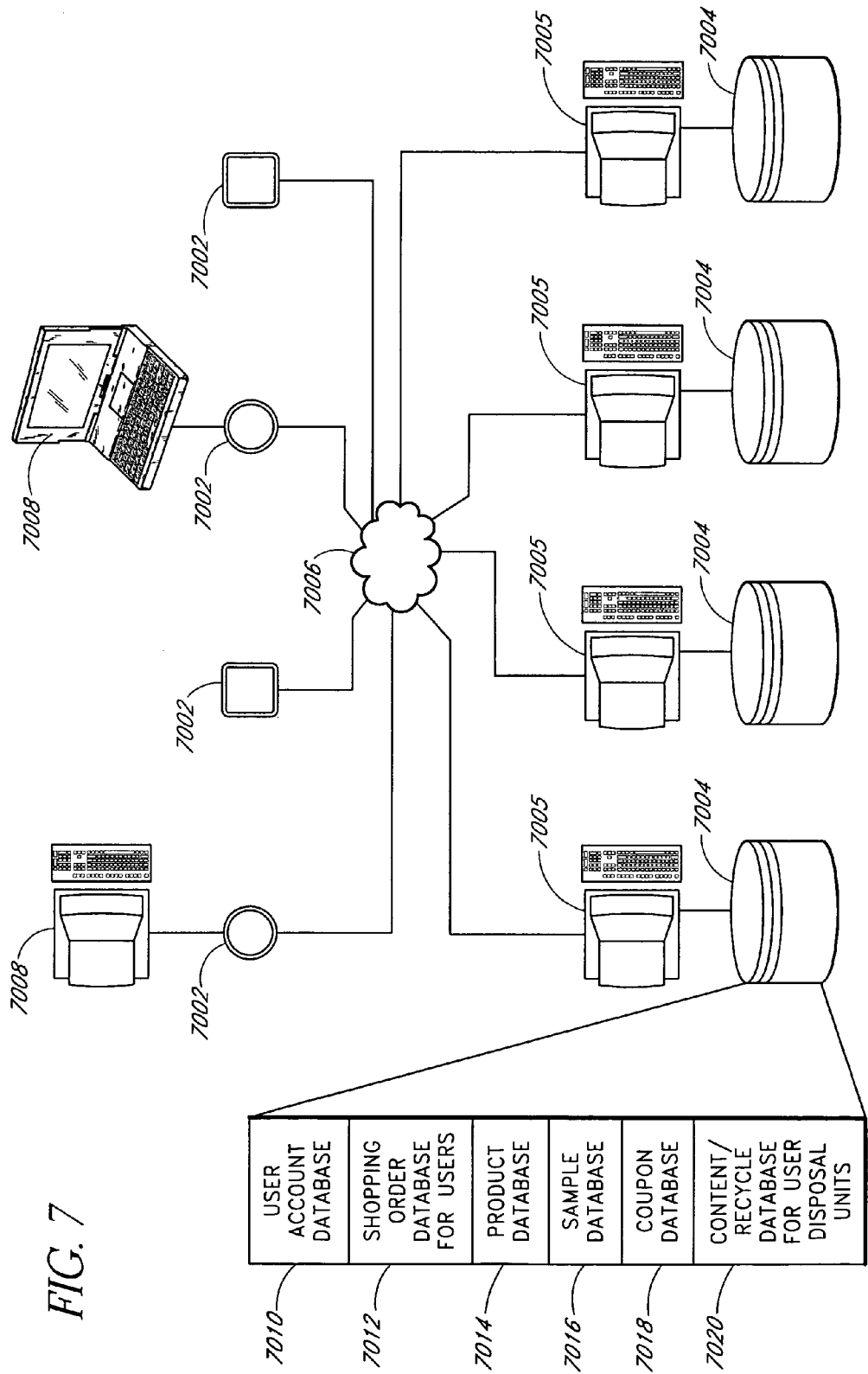
FIG. 7 illustrates a second example embodiment of a networked system.

FIG. 7 illustrates an example embodiment of a networked waste processing and replenishment system. The disposal units 7002 are coupled to one or more remote data processing systems 7005, comprising servers and databases 7004, via a wide area network, such as the Internet 7006. The databases 7004 can further comprise one or more of a user account database 7010, a product database 7012, a sample database 7014, a manufacturer database 7015, a coupon database 7016, and a content/recycle database 7018 for the disposal units 7002. The databases 7004 can optionally be searched using SQL queries using one or more of the database fields to find records having corresponding field data. For example, with reference to the product database schema discussed below, to locate samples having vegetarian ingredients, a query can be generated to locate product database records that have the Sample Flag set to a "1" and a Specialty Characteristic set to "vegetarian."

The user account database 7010 includes user account information, including user contact information, preferences, including order, sample, modes, shipment and/or delivery preferences. All or portions of the user account information may be entered or submitted, and later modified, by the user via a web site, disposal unit, phone, regular mail, email, or the like. One example user account database 7010 includes the following fields or records one or more of which can store information for a user:

USER ACCOUNT DATABASE SCHEMA

| FIELD | DATA DESCRIPTION |
|---|---|
| User Name | First name, Initial, Last name |
| Company | Name of company, if any |
| Mailing/Shipping Address | Street Address, City, State, Zip code, Country |

-continued

USER ACCOUNT DATABASE SCHEMA

| FIELD | DATA DESCRIPTION |
|---|---|
| Billing Address | Street Address, City, State, Zip code, Country |
| Daytime Phone | Phone number where user is available during the day |
| Nighttime Phone | Phone number where user is available during the evening or night |
| Fax Number | User's fax number |
| Mobile Number | User's cellular phone number |
| E-mail Address | User's e-mail address |
| User ID | Unique user identifier |
| User Password: | Password used to access user account |
| System Options | Connection configuration (Broadband, dialup, DSL, T1), Internet provider, etc. |
| Operating System | Operating System of user's personal computer (Windows ME, 2000, XP; MAC OS X, Linux, etc.) |
| Household/Company Demographics | Number of household members or employees, ages, number of each gender, household income |
| Payment Preference | Preferred form of payment (credit card, electronic fund transfer, check, place on account, etc.), and corresponding payment information (credit card number, and credit card expiration date, bank account number, checking account number), and order dollar value limit |
| Alternative Form of Payment | Alternative form of payment (credit card, electronic fund transfer, check, place on account, etc.), and corresponding payment information (credit card number, and credit card expiration date, bank account number, checking account number, etc.) |
| Disposal Unit 1 Identifier | Unique identifier, such as a serial number, associated with a first of the user's disposal units |
| Disposal Unit 1 Capacity | The capacity in units of measurement (gallons, liters, etc.) of Disposal Unit 1 |
| Disposal Unit 2 Identifier | Unique identifier, such as a serial number, associated with a second of the user's disposal units |
| Disposal Unit 2 Capacity | The capacity in units of measurement (gallons, liters, etc.) of Disposal Unit 2 |
| Disposal Unit n Identifier | Unique identifier, such as a serial number, associated with the $n^{th}$ of the user's disposal units |
| Disposal Unit n Capacity | The capacity in units of measurement (gallons, liters, etc.) of Disposal Unit n |
| User Order Preferences | Criteria for selecting to who the order is to be placed with (select supplier within user zip code, order from specifically named supplier or suppliers, select supplier with best quoted price, select supplier that accepts specified payment preference, etc.) |
| User Order Trigger Preference | Criteria for when to place the order (date, value of order, time period, etc.) |
| Order Confirmation Preference | Provide order confirmation as specified (phone, email, regular mail, and/or facsimile) |
| Sample Flag | Flag indicating whether user is willing to accept product samples ("1" - yes, "0" = no) |
| User Sample: Preferences | Criteria used to select product samples to be provided to user |
| Modes Suggestion Option Flag | Flag indicating whether user wants alternative products suggested in accordance with Modes Preferences ("1" - yes, "0" = no) |
| Modes Substitution Option Flag | Flag indicating whether user wants alternative products automatically substituted on the user's orders in accordance with Modes Preferences ("1" - yes, "0" = no) [optionally, no more than one of the Modes Substitution Option Flag and the Modes Suggestion Flag are allowed to be set |
| Modes Preferences | User selected order and delivery modes |
| Shipment Preference | User preferred level or method of shipping (same day, next day, two day, standard, lowest cost, environmentally friendly shipping) |
| Express Buy Shipment Preference | User preferred level or method of shipping for Express Buy option (same day, next day, two day, standard, lowest cost, environmentally friendly). Generally, the Express Buy Shipment Preference will be a faster form of shipment than that specified in the Shipment Preference field. |
| Delivery Options | Preferred day of week for delivery, preferred time range for delivery, request signature upon delivery, etc. Certain delivery options may be unavailable for certain forms of shipments. |
| Mode Rules | User specified mode rules |
| Waste Pickup Provider Preference | Preferred waste disposal provider (user can specify provider identifier, specify lowest cost provider, or provider that bids the most for recyclables) |
| Waste Pickup Trigger Preference | Pickup rule: Pickup at specified day, at a specified interval (twice a week, weekly), a specified amount of time since the last pickup, and/or when one or more disposal units are at a specified fill level (half full, three-quarters full, full) |

The order database 7012 stores pending or placed user orders. An example database record for a given user order can contain the following fields:

ORDER DATABASE SCHEMA

| FIELD | DATA DESCRIPTION |
|---|---|
| User ID | The user's unique identifier as recorded in the user account database |
| Item 1 Code | The SKU or other code used to identify Item 1 |
| Item 1 Price | The price quoted to the user when Item 1 was added to the user's order |
| Item 1 Date | The date Item 1 was added to the order |
| Item 1 Coupon | The coupon code for a coupon submitted by the user in relations to the order for Item 1 |
| Item 1 Price Date Guarantee | The end date for which the Item 1 price is guaranteed if the user has not yet placed the order |
| Item 1 Quantity | The quantity of Item 1 to be ordered |
| Status | The order status (pending, placed, or fulfilled) for Item 1 |
| Item n Code | The SKU or other code used to identify Item n |
| Item n Price | The price quoted to the user when Item n was added to the user's order |
| Item n Date | The date Item n was added to the order |
| Item n Coupon | The coupon code for a coupon submitted by the user in relations to the order for Item n |
| Item n Price Date Guarantee | The end date for which the Item n price is guaranteed if the user has not yet placed the order |
| Status | The order status (pending, placed, or fulfilled) for Item n |

The product database 7014 maps barcode or other item code to SKUs, product names, cost, sizes, calories, packaging materials, and/or the like. One example product database 7014 includes the following fields or records:

PRODUCT DATABASE SCHEMA

| FIELD | DATA DESCRIPTION |
|---|---|
| Product code | The item SKU |
| Price | The item price from a supplier selected in accordance with the user order preferences, which can be dynamically retrieved from the supplier's product pricing database |
| Quantity per Item | The number of units including in the item, for example, the number of cans of soda or the number of oz. of cleaning solution in a bottle of cleaning solution |
| Ingredients | The item ingredients |
| Calories | The number of calories in the item or the number of calories per item unit |
| Specialty Characteristic | Can specify if the item is low sodium, low cholesterol, low carbohydrate, non-fat, peanut-free, gluten-free, sugar-free, non-dairy, vegetarian |
| Packaging Material | The type of packaging material (recyclable plastic, recyclable cardboard, recyclable metal, non-recyclable plastic, non-recyclable cardboard, non-recyclable metal, non recyclable other) used for the item |
| Product name | The text name of the item |
| Sample Flag | A flag that when set to "0" indicates the item is not a sample, and when set to "1" indicates that the item is a sample |
| Family | The product family |
| Kind | The product kind |
| Manufacturer | The name of the manufacturer or other manufacturer identifier |
| Stock | The number of items in stock |

The manufacturer database 7015 includes information on the manufacturer that may be useful when locating products associated with a manufacture having certain characteristics or attributes which a user may deem desirable, such as the manufacturer's treatment of the environment, treatment of employees, support of a given social cause, and the like. By way of example, the user can specify that the user prefers or requires that ordered items be from a manufacturer that provides its employees health insurance and that donates money to AIDs prevention organizations. When the waste processing and replenishment system orders replacement items for the user, the system will search the manufacturer database to locate manufacturers who meet the criteria, and will then search for corresponding replacement items from the located manufacturers. One example manufacturer database 7015 includes the following fields or records:

MANUFACTURER DATABASE SCHEMA

| FIELD | DATA DESCRIPTION |
|---|---|
| Manufacturer ID | Manufacture name or other identifier |
| ISO 9000 | Quality compliance indicator with respect to ISO 9000 |

-continued

MANUFACTURER DATABASE SCHEMA

| FIELD | DATA DESCRIPTION |
|---|---|
| Living Wage | Indicator as to whether manufacturer pays employees a living or specified minimum wage |
| Health Benefits | Indicator as to whether manufacturer provides employees health benefits and/or insurance |
| Child labor | Indicator as to whether manufacturer employs child labor |
| Charities/Social causes | Names, Tax ID, and/or other identifier to which manufacturer donates money or other resources |
| Renewable Resources | % of energy utilized by manufacturer that comes from renewable resources |

The sample database 7016 stores information regarding available samples and their characteristics, where the characteristics can include the sample product category, the size of the sample and the contents or sample ingredients. Optionally, the sample database 7016 need not be used, and instead the sample product information is stored in the sample database, wherein the sample flag discussed above is used to indicate which products are samples. One example sample database 7014 includes one or more of the following fields or records:

SAMPLE DATABASE SCHEMA

| FIELD | DATA DESCRIPTION |
|---|---|
| Sample Item Product code | The sample item SKU |
| Regular Product codes | SKUs corresponding to non-sample versions of the sample item |
| Quantity per Item | The number of units including in the sample item |
| Sample Item Ingredients | The sample item ingredients |
| Sample Item Calories | The number of calories in the item or the number of calories per item unit |
| Sample Item Packaging Material | The type of packaging material (recyclable plastic, recyclable cardboard, recyclable metal, non-recyclable plastic, non-recyclable cardboard, non-recyclable metal, non recyclable other) used for the sample item |
| Sample Item Product Name | The text name of the sample item |
| Stock | The number of sample items in stock |

The coupon database that includes a mapping of coupon codes to the items or services for which the coupon can be applied, the coupon start date which indicates when the coupon can be first used, the coupon expiration date, an indication as to whether the coupon can or cannot be used in conjunction with other coupons, an optional unique code number that identifies each coupon, coupon status, that indicates if a corresponding coupon can still be used, and for customer-specific coupons or coupons that can only be used a specified number of times, a record as to whether the coupon has been used yet and/or how many times the coupon has been used.

The coupon value can be expresses as a dollar or specific monetary value, a percent discount, a free shipping coupon, or a "Buy X get Y Free" coupon, where the user gets one or more free Y items if the user buys one or more X products. The coupon can be in the form of a membership benefit, such as a discount afforded to members or preferred members of a buying club or organization. The coupons can be electronic coupons that have a code which can be entered via the disposal unit 7002 or the computing device terminal 7008. One example coupon database 7016 includes one or more of the following fields or records:

COUPON DATABASE SCHEMA

| FIELD | DATA DESCRIPTION |
|---|---|
| Coupon Identifier | the code associated with the coupon |
| Start Date | the date when the coupon is first valid |
| End Date | the last day the coupon is valid |
| Times useable | the number of times the coupon can be used |
| Times used | the number of times the coupon has been used |
| Coupon value | expressed as a specific monetary value, a percent discount, free shipping, or a "Buy X get Y Free" |

The content/recycle database 7020 can include a list of items and/or packaging materials deposited in each disposal unit 7002, where multiple disposal units 7002 can be associated with the same user and/or different users. One example content/recycle database 7020 for a user includes one or more of the following fields or records:

CONTENT/RECYCLE DATABASE SCHEMA

| FIELD | DATA DESCRIPTION |
|---|---|
| User ID | The user's unique identifier as recorded in the user account database |
| Disposal Unit 1 Identifier | Unique identifier associated with a first of the user's disposal units |
| Item 1 Code | The SKU or other code used to identify Item 1 |
| Item 1 Packaging Material | The type of packaging material for Item 1 (recyclable plastic, recyclable cardboard, recyclable metal, non-recyclable plastic, non-recyclable cardboard, non-recyclable metal, non recyclable other) used for the item (obtained by accessing the product database using Item 1 Code) |
| Item n Code | The SKU or other code used to identify Item 1 |
| Item n Packaging Material | The type of packaging material for Item n (recyclable plastic, recyclable cardboard, recyclable metal, non-recyclable plastic, non-recyclable cardboard, non-recyclable metal, non recyclable other) used for the item (obtained by accessing the product database using Item 1 Code) |

Figure 8A:
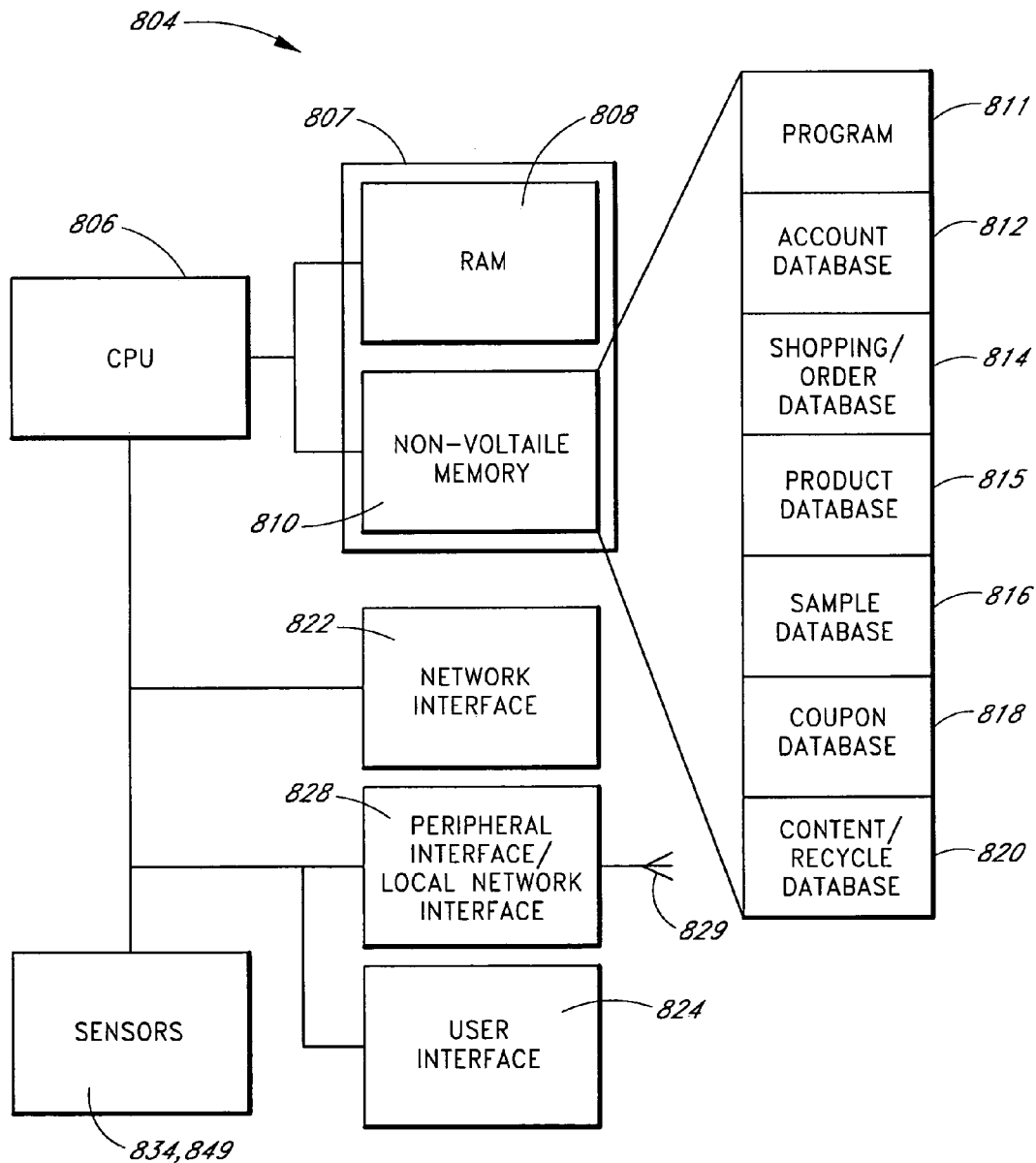
FIGS. 8A–C illustrate a second example trash disposal device and ordering system.

The data processing systems 7005, including the databases 7004, can be associated with the data processing system operator, a supermarket, a distribution center, a waste disposal and recycling entity, a delivery service, a logistics company, and/or a third party operator. As illustrated in FIG. 8A, the disposal units 7002 optionally maintain databases storing the same or similar information to that of databases 7004 discussed above, however each unit 7002 optionally only stores user account and order information for one user, household, and/or disposal unit. Optionally, portions of the user account, product, manufacturer, samples, coupon, and content/recycle database information will only be kept by one of a local database and a remote database, while portions of the user account, product, manufacturer, samples, coupon, and content/recycle database information will be kept in both a local database and a remote database.

The disposal units 7002 are optionally coupled to a local external computing device 7008 via a peripheral interface, such as a USB or FireWire bus, via a wired local network, such an Ethernet network, and/or a wireless network, such as an IEEE 802.11b or IEEE 802.11g compliant network. The computing device 7008 can be personal computer, set top box, PDA, Internet appliance, or the like. The computing device 7008 can be used to setup and change preferences for the unit 7002, store, retrieve, and modify content and order lists, and can be used to access the system operator's web site in order to set up an account, review and modify account information, review and modify order information, and the like. In addition, the computing device 7008 can be used by the unit 7002 as an access point to the Internet 7006.

As illustrated in FIG. 8A, the disposal unit 7002 includes an integral computer 804 and/or an interface to an external computing device, such as computing device 7008, or other personal computer, Internet appliance, interactive television, set top box, personal digital assistant, and the like. The integral computer 804 includes a central processing unit (CPU) or controller 806, memory 807, including volatile memory 808 and non-volatile memory 810 that store data as well as program code 811. The integral computer 804 processes data and controls the operation of the disposal unit 7002, including the scanner, lid, network interface, and user interface. For example, the non-volatile memory 810 can include fixed or removable solid state FLASH memory, battery backed memory, a magnetic disk drive, and/or an optical disk drive. The volatile memory 808 can include, for example, RAM.

The stored program code 811 can include one or more instructions, which can be straight-line code and/or organized as modules or objects configured to receive and process inputs, provide outputs, and to selectively store data. The data can include a serial number for the unit 7002, user preference data, a mapping of product codes or SKUs to product names, sizes, and packaging materials, as well as disposal unit 7002 content information regarding items placed into the disposal unit 7002, shopping lists, passwords and/or unique identifiers for accessing remote databases and services, and the like. The data can be stored in one or more local databases, such as a user account database 812, an order database 814, a product database 815 that includes mappings of item codes to item product information, a sample database 816, a coupon database 818, and a waste/recycle database 820. The local user account, order, product, sample, coupon, and waste/recycle databases 812, 814, 815, 816, 818, and 820 can store the same or similar information as discussed above with respect to the corresponding remote user account, product, manufacturer, samples, coupon, and content/recycle databases 7010, 7012, 7014, 7015, 7016, 7018, 7020.

By way of example, some or all of the databases 812, 814, 815, 816, 818, and 820 can be located in the disposal unit 7002's non-volatile memory 810, or in the local personal computer's 7008 memory.

The example disposal unit 7002 includes, directly and/or via an external device, an interface device 822 to a wide area network such as the Internet. The interface device 822 can be a dial-up modem, a cable modem, a DSL modem, a T1 modem, a wireless modem, satellite interface, or other network interface, that correspondingly interface to a Public Switched Telephone Network, a cable network, a DSL or ADSL line, a T1 line, a wireless network, a satellite network, or other network. The network interface device 822 is coupled to the CPU 806 and to a data or telephone network. If a wireless interface device is used, an antenna 829 is included. The disposal unit 7002 can also be coupled via a wireless access point to a Public Switched Telephone Network, a cable network, a DSL or ADSL line, a T1 line, a wireless network, a satellite network, or other network.

Figure 8B:
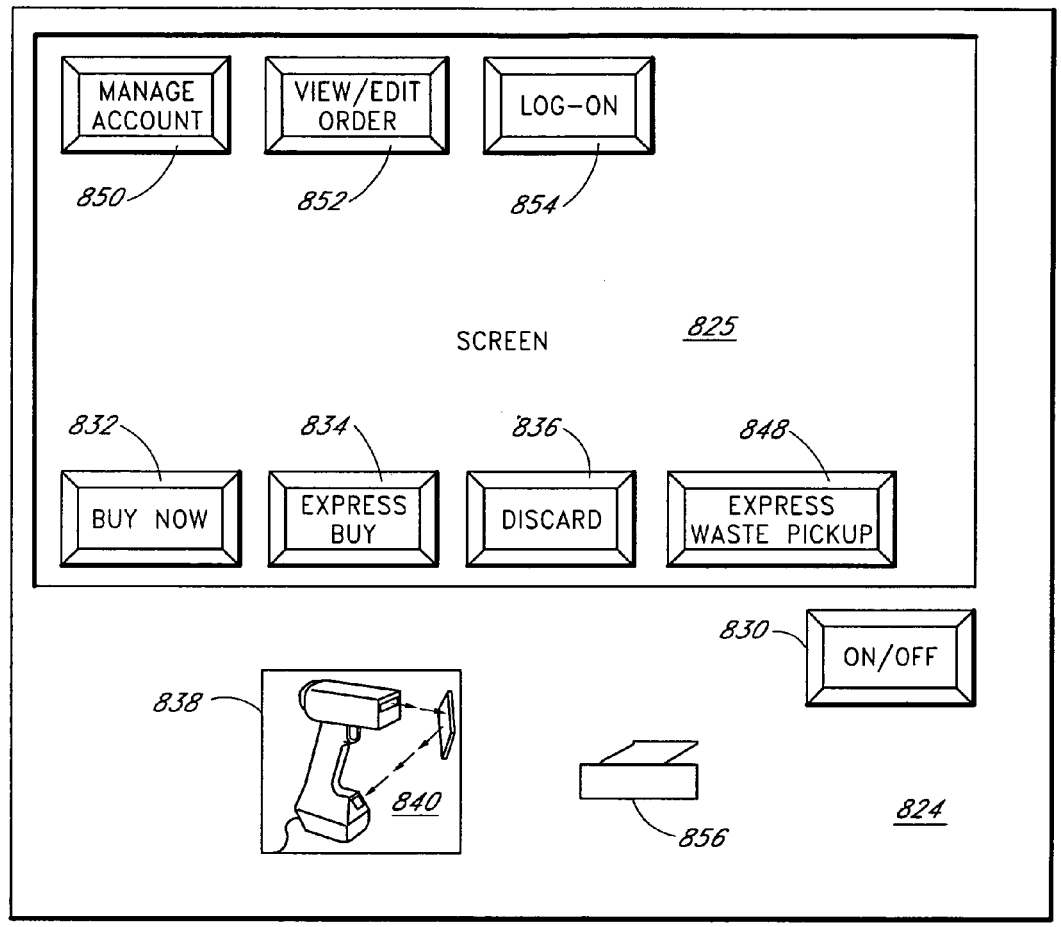

The disposal unit 7002 further includes, directly and/or via an external device, a user interface device 824, such as a touch screen or non-touch screen display 831, keyboard, voice command interface, and/or the like, which are optionally grouped on a control panel, as illustrated in FIG. 8B, distributed on different portions of the unit 7002. The user interface device can be fixedly mounted, attached via a hinge so the angle of the device 824 can be changed by the user, or can be detachable and interface to the disposal unit 7002 using a wireless interface device, such as a Bluetooth or IEEE 802.11 interface device.

In one embodiment, the disposal unit 7002 includes an integral display with a touch screen, keys, a printer, and can further be operated via the external computing device 7008. The computing device 7008 can coupled to the unit 7002 via a local peripheral bus interface 828, such as a USB or FireWire interface or via a local network, such an Ethernet network, or a wireless IEEE 802.11b or IEEE 802.11g network.

The CPU 806 can be further coupled to a fill-level detection sensor system 843 and a pressure sensor 849 discussed in greater detail below.

The disposal unit 7002 can include a power on/off key 830 and one or more function-specific hard keys and/or soft keys displayed on the touch screen. The key functions can be software programmable. These keys enable the user to modify the operation of the unit 7002 and/or the processing of user's orders without having to go through a complex menu hierarchy, though such a menu hierarchy can be used as well. By way of example, the specific functions keys can include a "Buy Now" key 832, an "Express Buy" key 834, and a "Discard" key 836.

Activation of the Buy Now key 832 overrides the user's order trigger preferences, and instead triggers the substantially immediate placement of the stored, pending order. Thus, the order will be placed during the current session or the next time the unit 7002 connects to the remote system 7005. Activation of the Express Buy key 834 causes the transmission of an instruction to the system 7005 operator to have the specific scanned product or products delivered using its fastest available or an expedited delivery service. For example, a consumer can use the Express Buy key 834 when the consumer needs a lamp or a battery urgently. Activation of the Discard key 836 will add the discarded item's scanned information to a waste/recycling database but will not add the discarded item to a pending order. Thus, a user can activate the Discard key 836 when the user does not want a replacement for the disposed of item. Optionally, the Buy Now and Express Buy instruction can also be issued by the user via the waste processing and replenishment system operator's web site.

The disposal unit 7002 includes one or more scanners 838 coupled to the CPU 806. The scanners 838 are used to scan codes on disposed of items, coupons, and other materials. The codes can be used to encode one or more of a product code, SKU, the name of the item, the size of the item, the item container-type and materials, the brand of the item, the cost of the item, and the expiration date of the item. The scanners can include one or more of an optical scanner, such as a barcode scanner, or a RFID scanner.

The RFID scanner includes an antenna or coil, a transceiver, and a decoder. The RFID scanner is used to scan an RF tag programmed with information that is fixed to the item. The transceiver produces signals that are emitted by the antenna as radio signals. The radio signals are used to activate the RF tag and to read and write data to it. The antenna can be mounted, by way of example, on the lid 842, or in or on the unit 7002 body.

The scanners can include a handheld head 840 coupled to the disposal unit 7002 via a cable or wireless Bluetooth connection. In another embodiment, the scanner head 840 is fixedly mounted to the disposal unit 7002. In one embodiment, the scanner is a self contained unit that stores scanned data internally and then downloads the data to the disposal unit 7002 or to a computing device, such as the computing device 7008.

Figure 8C:
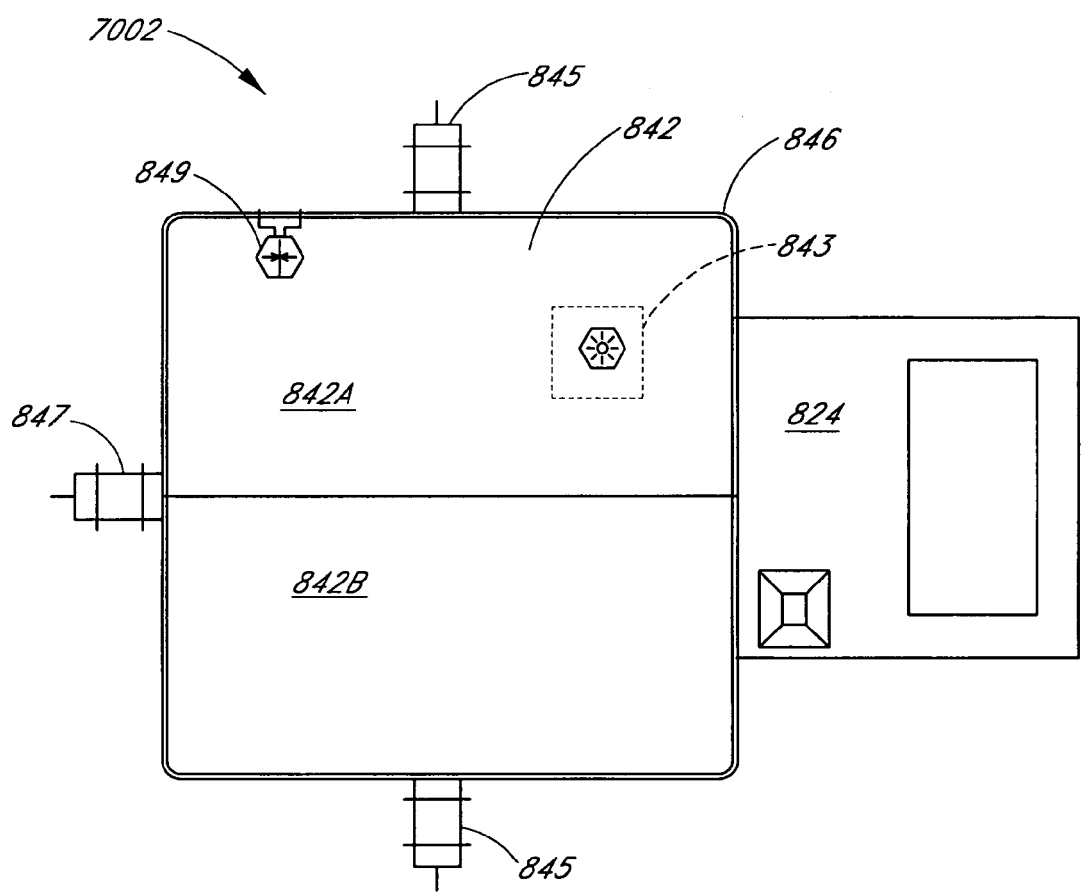

As illustrated in FIG. 8C, a cover or lid 842 is optionally provided to close the disposal unit 7002 receptacle opening 846. The cover 842 can be automatically opened and closed by one or more motors 845 receiving and a discarded item. The motors 845 can be positioned on the exterior or interior of the unit 7002. In addition or alternatively, the cover 842 can be manually opened and closed. The cover 842 can be a two piece assembly that has two lids 842A, 842B, each covering about half of the receptacle opening 846 and meeting at about the middle of the receptacle opening 846.

A processor controlled actuator or solenoid 847 can be used to selectively hold the lid 842 or lids in the closed position or can release the lid 842 or lids so as to swing open. The actuator 847 can be positioned on the exterior or interior of the unit 7002. In addition, each lid 842A, 842B can have a spring-loaded hinge so as to swing open without additional motive force. In another embodiment, only a single lid 842 hinged on one side is used. The lid(s) can be used to support the item during the scanning process or a separate shelf is optionally provided to support the item.

The fill-level detection sensor system 843 coupled to the CPU 806 is located within the disposal unit 7002 to detect and confirm that the user disposed of the item. The sensor system 843 can include one or more sensors. In one embodiment, the sensor system 843 can comprise an optical sensor that emits a light beam and that detects when an object, such as the disposed of item, falls into the light beam path via reflection from the item. In another embodiment, the sensor system 843 can comprise a sonar sensor that emits sonic waves and that detects when an object, such as the disposed of item, falls into the sonic wave path via reflection from the item. The detection sensor system can include several sensors at different heights so as to detect how full the unit 7002 is. For example, a sensor can be placed at the halfway point, the three-quarter way point, and at the full capacity point.

In addition, the pressure sensor 849, coupled to the CPU 806 and in contact with the lid 842, can be used to sense when an item is placed on the lid 842 or when the user presses down on the lid 842 which will then cause the scanning process to begin. In another embodiment, the user activates a soft or hard key to initiate scanning.

The body of the disposal unit 7002 can be made from a variety of materials, such as, by way of example, plastic, rubber, metal, cardboard, or a combination thereof. In addition, the disposal unit 7002 can be manufactured in different capacity sizes, such as 9 gallons, 13 gallons, 25 gallons, and the like. The disposal unit 7002 can be powered, for example, via an AC line, battery, and/or solar power. The disposal unit 7002 can be used in conjunction with removable, disposal garbage bags.

Optionally, before using the disposal unit 7002 to generate orders and the like, the user sets up user profile information and preference information via a web site or other site associated with the disposal unit 7002 operator, or via phone, mail, or computer readable media. For example, the user can access the web site using the computing device 7008. In addition, the user can access the web site to manage the user's account, including viewing the user's order history, managing open and pending orders, viewing order status, and viewing the user's consumption statistics over a specified period of time or since account inception. The information can include for example, that discussed above with respect to the user account database schema or portions thereof.

Figure 9B:
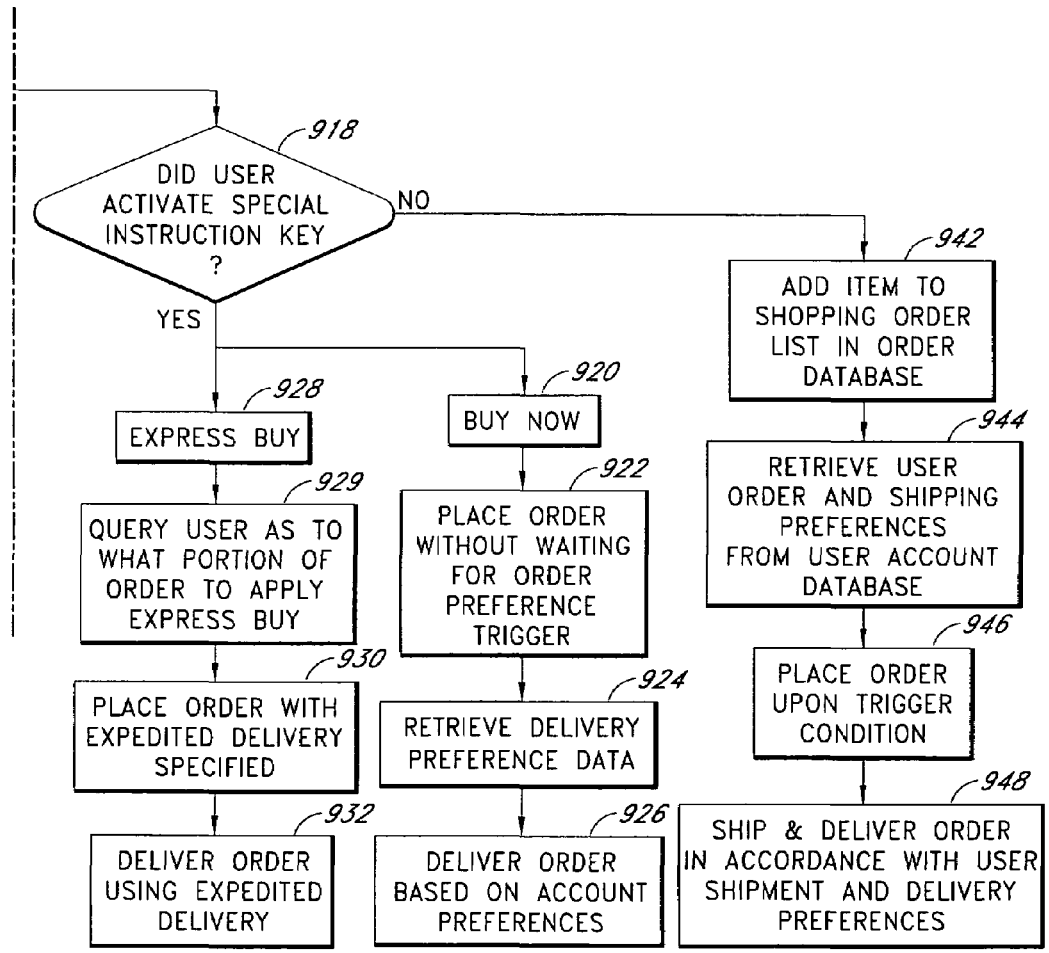
FIG. 9 illustrates an example scanning, identification, and ordering process.

FIG. 9 illustrates an example scanning, identification, and ordering process. However, not all the states need to be performed, and the order of the process can be varied. In addition, during appropriate process states, the user can be dynamically presented with the user's current pending order list in response to user request or other trigger. Similarly, an indication as to when a pending order will actually be placed and/or the next scheduled delivery date for a pending order can be presented to the user in response to user request or other trigger. Information can be presented to the user via on the disposal unit display 825 or on a local computing device display. Further, the user can interrupt the process by activating the Discard key.

Beginning at state 902, the process proceeds to state 904, where the user sets-up or modifies account preferences. As similarly discussed above, the preferences can include order, sample, modes, shipment, and delivery preferences. For example, the user can specify an order trigger preference which causes the pending order to be placed. The user can specify that the trigger will be the elapse of a specified period, such as a week or month, since the previous order. Another trigger preference can be to place the order when the total value of the order equals or exceeds a certain dollar amount. The order preference can specify which supplier or suppliers to use. The user can also specify that the order should be placed with the provider having the lowest price for the total order, including shipping, specify a particular supplier for a specific consumable, specify that the order should be placed with a provider that accepts a designated form of payment, such as payment by credit card, billing, or check.

As discussed below, the sample preferences can include user-specified types of products the user will not accept samples off, such as those containing certain food types such as pork, poultry, beef, fish, and/or seafood. The sample preferences can further specify that the user only wants samples that have a certain characteristic. For example, the user can specify with respect to food products, the user only wants samples of certain types or categories of food products, such as vegetarian, low fat, low sodium, and/or kosher food products.

The shipment and delivery preferences can include frequency of delivery, day of week, time, address, order confirmation by phone or email, signature upon delivery, normal delivery, lower priced delivery for choosing "Environment-friendly Shipping Day," or expedited delivery. The "Environment-friendly Shipping Day" process is used to reduce traffic and pollution by planning deliveries within a geographic area, such as a block or within a zip code, so that multiple deliveries can be made on the same day to that area to thereby reduce the number of trips to the area and so traffic and pollution are reduced.

At state 905, the special instructions keys are read. For example, the disposal unit 7002 detects, via an interrupt, scan, or polling routine, whether the user activated one of the special function keys or otherwise provided a corresponding instruction. As discussed above with respect to FIG. 8B, the specific functions keys can include the "Buy Now" key 832, the "Express Buy" key 834, and the "Discard" key 836. Optionally, the Buy Now and Express Buy instructions can be issued by the user via the waste processing and replenishment system operator's web site.

At state 906, the user scans a machine scanable code printed or otherwise affixed to the item being discarded. The scanned information can be received and stored in local memory 807, and/or in one or more remote databases 7004. The scan operation can be initiated by the user activating a scan key or can be automatically initiated by the disposal unit 7002 in response to the item being in proximity of the unit 7002 or placed on the lid 842. The disposed of item can be a food container, a cleaning product container, or the like. The containers can be empty, partially filled, or full.

The scanable code may be affixed by the manufacturer, retailer, distributor, or the user may apply code. The code can be a barcode, RFID tag, other electronic tag, magnetically encoded label, or the like. Once the item is scanned the disposal unit 7002 door is automatically or manually opened, the user deposits the item in the disposal unit 7002, and optionally the sensor system 843 confirms that the item was indeed deposited. Once the confirmation is provided, the remote or local content/recycle database is updated to include the discarded item.

If the user presses a "Discard" instruction key, the process proceeds to state 934, and a Discard sub-process is performed. At state 936 the scanned item is not added to a pending order and the process ends. Thus, a user can activate the Discard key 836 or otherwise provide a discard instruction when the user does not want a replacement for the disposed of item. The user is optionally asked to provide feedback as to why the user does not want to order a replacement for the discarded item. For example, the reasons for not ordering can include "I do not use this type of product anymore," or "I already have inventory of this product in my home." Optionally, if the discarded item is a sample, sample-specific feedback can be requested, such as "I tried the sampled product, but did not like it," "I tried the sampled product and liked it, but I still prefer to use my current brand," "I did not try the sample, and do not want to order it." The user is asked to select a reason, and the selected reason is stored locally by the disposal unit 7002 and/or is transmitted for storage to the remote database 7004. The user feedback can then be distributed to appropriate manufacturers, retailers, distributors, marketing entities and advertisers who can use the feedback to perform a market analysis and/or to refine their product offerings.

If the Discard key was not activated, the process proceeds from state 907 to state 908. At state 908, the scanned code is used to determine one or more of the identity of the item, the size of the item, the item container-type, the brand of the item, the cost of the item, and/or the expiration date of the item. The scanned code can directly include the foregoing information or can include a product code or SKU that can be used as a key to locate and access the information in a local or remote product database.

The product database can be stored in the disposal unit 7002's local memory, such as is product database 815, and/or accessed via a local or wide area network. For example, the product database can be a remotely located database 7004 and can be accessed over the network 7006 by large numbers of disposal units 7002. As similarly discussed above, the remote databases 7004 can be associated with a supermarket, a distribution center, a waste disposal and recycling entity, a delivery service, and/or a third party operator.

The transactions with the remote database 7004 can be securely performed, using Secure Sockets Layer (SSL) protocol that provides encryption and authentication using digital certificates, using the World Wide Web Secure HTTP (S-HTTP) protocol. Other forms of secure communication, such as Virtual Private Networks (VPN) can be used as well. In addition, for authentication purposes unit 7002 can transmit a password or unique identifier associated with the disposal unit 7002 or the disposal unit 7002's owner or licensee.

In one embodiment, the disposal unit 7002 first attempts to locate and access the desired item information from the internally stored product database 815, and if a match is not found, then accesses the remote database 7004. The local database 815 can periodically be updated by synchronized with one or more remote databases 7004 using, for example, SyncML file exchanges.

If the remote database 7004 is being accessed, once a secured connection is established, the scanned product code and/or information related thereto, is transmitted by the discard unit 7002 to the remote data processing systems 7005. The remote database 7004 locates information corresponding to the scanned product code. However, when an attempt to connect to the remote data processing systems 7005 is unsuccessful, or the remote database 7004 or remote data processing systems 7005 are otherwise unavailable, the disposal unit 7002 stores the product code and other information in local memory 810. The disposal unit 7002 will then attempt to connect to the remote data processing systems 7005 according to one or more predefined rules, such as every predetermined number of minutes or at another specified time. Optionally, until a connection is successfully accomplished, a warning is displayed to the user on the disposal unit display 825 notifying the user of the failure to connect. Once a connection to the remote data processing systems 7005 is established, the product code is transmitted by the unit 7002 to the database 7004.

The information accessed from the local or remote databases can include the product name, price, cost per unit, size, calories, ingredients, categorization, as well as other information stored in the databases, including for example, the information discussed above with respect to product database 7014. The located information can be transmitted directly back to the disposal unit 7002 or to the local computing device 7008 coupled to the disposal unit 7002. The information or a portion thereof, is then displayed to the user and the disposal unit cover 842 is automatically or manually opened.

For example, the information can be displayed on the disposal unit display 825 or on a local computing device 7008 monitor. The user can print out the information using the disposal unit printer 856 or using a printer connected directly to the computing device 7008. Further, related information, such as advertisements for a product or electronic coupons, can be transmitted from the remote data processing system 7005 to the disposal unit 7002 for display or printout. The advertisement or coupon can optionally be based on one or more of the user's disposed of items, pending orders, selected modes, buying habits and prior orders, and household demographics.

At state 910 a determination is made by the disposal unit 7002, the computing device 7008, or the remote data processing systems 7005, that the scanned item is a sample. This determination is made by comparing the scanned information to the data stored in the remote and/or local product databases 7014, 815, or in the remote or local sample databases 7016, 816. For example, if the scanned information contains a product code, an SQL query can be generated to locate the corresponding product database record, and if the sample flag is set to a "1", the scanned item is identified as a sample. Otherwise, the scanned item is not identified as a sample. Alternatively or in addition, an SQL query can be generated to locate the corresponding sample database record, and if a match is found, the item is identified as a sample. Otherwise, the item is not identified as a sample. If the item is not identified as a sample, the process proceeds to state 911 where a modes application process is performed, as described in greater detail with respect to FIG. 18. The process then proceeds from state 911 to state 918.

If the scanned item is identified as a sample, the process proceeds from state 910 to state 912. The user is queried directly by the disposal unit 7002, or by the remote processing system 7005 via the disposal unit 7002 or computing device 7008, as to whether the user wants to order a regular, non-sample version of the item.

If the user responds in the negative, the process proceeds to state 938, and user is asked to provide feedback as to why the user does not want to order a regular, non-sample version of the item. For example, the reasons for not ordering can include "I do not use this type of product," "I tried the sampled product, but did not like it," "I tried the sampled product and liked it, but I still prefer to use my current brand," "I did not try the sample, and do not want to order it." The user is asked to select a reason, and at state 940 the selected reason is stored locally by the disposal unit 7002 and/or is transmitted for storage to a remote database 7004. The user feedback can then be distributed to appropriate manufacturers, retailers, distributors, and who can use the information to perform a market analysis and/or to refine their product offerings.

If the user responds affirmatively at state 912, the process proceeds to state 914 and the user is requested to specify the size and/or number of units of the regular version that the user wants to order. At state 916, the user order information is received and added to the pending user order stored in the remote and/or local order databases, or if there is no pending order, to a new order. In addition, the fact that the regular version was ordered after the user discarded the sample is recorded in remote database 7004 for distribution to suppliers, retailers, research, and/or marketing firms who can use the information to perform a market analysis and/or to refine their product offerings. The process then proceeds to state 918.

As discussed above, if the scanned item is not a sample, or if the user ordered a regular version of an item sample, the process proceeds to state 918. At state 918 the special key activations, if any, read at state 905 are retrieved.

If the user provided a "Buy Now" instruction, the process proceeds to state 920, and a Buy Now sub-process is performed. At state 922, the item is added to the pending order and the order is placed, overriding or bypassing the user's preference trigger. The order instruction is transmitted via the network 7006 to one or more data processing systems 2005. At state 924, the user's delivery preferences are retrieved from the local or remote user account database. For example, the user may have specified that same day, next day, two day, standard, lowest cost, or most environmentally friendly shipping is to be used. At state 926, the order is delivered by a delivery service or supplier in accordance with the user's standard shipping preferences.

If the user provided an "Express Buy" instruction at state 918, the process proceeds to state 928, and an Express Buy sub-process is performed. Optionally, at state 929 the user is queried via the disposal unit 7002 whether the user wants to apply the express buy instruction to the user's entire pending order list, to a subset of the pending order list, or only to the item just scanned. The query can originate from the disposal unit 7002 itself, or can be transmitted from the data processing system 7005.

At state 930, the order is placed with expedited delivery specified in accordance with the user's instruction, and an order instruction is transmitted to one or more remote data processing systems 7005. Thus, even if the user has specified in the user's account database Shipment Preference field that the lowest cost delivery should normally be used, by issuing an express buy instruction, a higher level of delivery service will be used. Optionally, the expedited delivery can have a default value, such as same day delivery. Alternatively or in addition, the user can specify in a user account Express Buy Shipment Preference field what level or type of delivery is to be used when an express buy instruction is received. For example, the user can specify that same day, next day, two day, or standard shipping is to be used for express buys. At state 936 the order is delivered by a delivery service or supplier to the user specified shipping address using the specified or default express buy shipping.

If the user provided a "Discard" instruction at state 918, the process proceeds to state 934, and a Discard sub-process is performed. At state 936 the scanned item is not added to a pending order and the process ends. Thus, a user can activate the Discard key 836 or otherwise provide a discard instruction when the user does not want a replacement for the disposed of item.

If at state 918 the user did not activate one of the special function keys discussed above, or otherwise issue a corresponding instruction, the process proceeds to state 942, where the scanned item is added to the user's pending order list stored in the remote and/or local order database. At state 944, the user's order preferences are retrieved from the remote and/or local user account database. At state 946 the order is placed upon the occurrence of the user-specified order trigger preference. As discussed above, the user order trigger preference can be that an order is to be placed one week after the previous order, every second week after the previous order, monthly, at other specified times or periods, or when the total value of the order equals or exceeds a certain level. At state 948, the order is delivered by a delivery service or supplier in accordance with the user's standard account shipping preferences.

Once an order is place, an order confirmation can be provided by the system operator, supplier, or delivery service. Optionally, the preferred type or types of confirmation can be specified by the user, and the preference stored in the remote or local user account database for later retrieval. The confirmation can be sent to the user via email, regular mail, a web site page, text messaging, instant messaging, or using other messaging techniques as specified by the user or using a default order confirmation type. The order confirmation includes a list of the items ordered, the cost of each item, the total cost, any discounts applied, delivery charges, if any, and the scheduled delivery date and time, or a range of dates and/or time in which the delivery is to be performed. The order confirmation will also indicate if any of the ordered items are unavailable. A shipping confirmation can be similarly provided one day before delivery, or when the orders have been shipped. The shipping confirmation can provide updated delivery dates and times.

Optionally, deliveries can be performed by a third-party logistics company, such as FedEx, DHL, UPS, or the U.S. Postal Service. The disposal and replacement system operator can print user address labels and provide the labels and/or products, such as sample products to the logistic company responsible for delivery.

One embodiment of the present invention facilitates efficient waste pick-up, processing and recycling operations. As discussed above, when discarded items are scanned, the disposal unit 7002 and/or remote databases 7004 record information identifying the items scanned and therefore have information on the disposal unit's contents. This information can then be used to access information on the materials used in the discarded item's packaging and containers. In one embodiment, the disposal unit 7002 contains a waste bag. When the user replaces the bag, the user activates a Replace Bag key and in response, the disposal unit 7002 prints one or more barcodes on the bag, or on a label which is affixed to the bag by the user. Optionally, the bags can come with preprinted unique barcodes acting as a bag serial number which can then be associated in the database with the bag contents and/or the user. The printed barcodes contain information on the materials used in the discarded packaging and containers printed on it. The user can scan the barcodes and the information is transmitted to a waste management company. Optionally, consumers will receive credit or payment from the waste management company, a government agency, or other entity for their recyclable waste.

Figure 10:
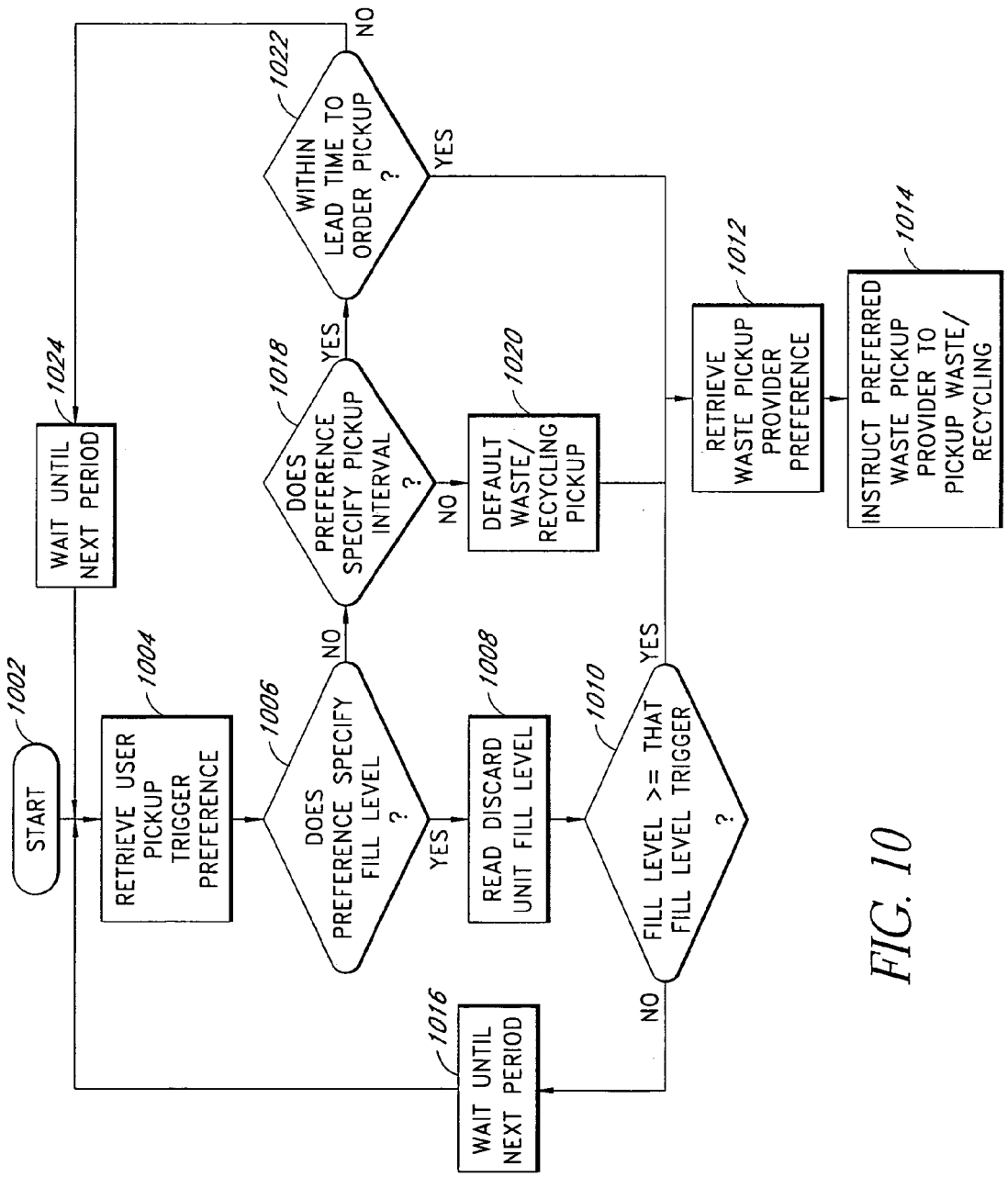
FIG. 10 illustrates an example waste and/or recycling process.

FIG. 10 illustrates another example waste and/or recycling process. The process starts at state 1002 and proceeds to state 1004. The user waste/recycling pickup trigger preference or rule is retrieved from a local or remote user account database. For example, the pickup trigger preference can specify that the pickup should occur at specified day of the week, at a specified interval (twice a week, weekly), and/or when one or more disposal units or at a specified fill level (half full, three-quarters full, full). At 1006 a determination is made whether the preference trigger specifies a fill level. If yes, the process proceeds to state 1008 and the fill level is read by fill-level sensor system 843. At state 1010 the fill level is compared to that specified by the preference trigger and if the fill level equals or exceeds that specified by the preference trigger the process proceeds to state 1012. Otherwise, the process proceeds to state 1016, and the process is repeated after a determined interval, which can be, for example, every hour, every 8 hours, every day, or at other intervals.

At state 1012 the waste pickup provider preference is read from the user account database. For example, the user can specify a specific provider using the provider's name or other identifier, or that the lowest cost provider is to be used. If the user specified that the lowest cost provider is to be used, the pickup is put out for bid. The information included in the bid request includes the disposal unit 7002 contents so that the bidders can determine the value of the recyclables and the cost of disposing the non-recyclable items. At 1014, the selected provider is instructed to perform the pickup, and the pickup takes places.

If at state 1006, it is determined that the trigger preference is not based on the fill level, the process proceeds to state 1018, where a determination is made as to whether the pickup trigger preference specifies a pickup interval or specific day. If not, the process proceeds to state 1020 and a default waste/recycling pickup schedule is used. The process then proceeds to states 1012 and 1014 as similarly discussed above.

If at state 1018, it is determined that the pickup trigger preference specifies a pickup interval or specific day, the process proceeds to state 1022 and a determination is made if the pickup instruction is to be provided at this time. If yes, the process proceeds to states 1012 and 1014 as discussed above. Otherwise, the process proceeds to state 1024 and the process is repeated after a predetermined period.

A process of providing samples in accordance with one embodiment of the present invention will now be described. As orders begin to be automatically generated based on consumers' actual consumption of items, consumers may be less influenced by advertisement and less likely to make impulse purchases. Advantageously, as similarly discussed above, one embodiment of the present invention provides a process for manufactures and suppliers to market new items to consumers despite the automatic ordering process. Further, consumers are provided with a process for specifying characteristics of items that they are interested in sampling.

The sampling process is optionally an opt-in process, wherein users indicate their desire to participate in the sampling process. By enrolling in a sampling program, qualifying users will receive free samples of products delivered to their home or other specified delivery address. The samples optionally include a barcode or other code on the product packaging indicating that the product is a sample. The barcode can be included or be in addition to the item SKU. After using or consuming the product, the user scans the code and disposes the product in the disposal unit 7002 as similarly discussed above for non-samples. The user's pending order can then be amended to include a regular version of the sampled product. Optionally, before adding the regular version of the sampled product to the order, the user is prompted to confirm that the user wants to add it to the order. The fact that the user ordered a regular version of the sampled product is stored in a sample database for distribution to appropriate manufacturers, retailers, distributors, and advertisers to the extent permitted by the applicable privacy policy and/or government regulations.

The example sampling process further prompts users to provide feedback and then collects and stored such feedback in a sample database. As similarly discussed above, in one embodiment, when the user disposes of a sampled product, the user scans the sampled product's code and the disposal unit or remote data processing system identifies the discarded product as a sample from the scanned code. If the user then activates the Discard key, indicating that the user does not want to order a regular version of the sampled product, the user is prompted to provide feedback. For example, a feedback form is presented on the disposal unit's display, listing several potential reasons why the user may not have wanted to reorder the item. The user is asked to select a reason, and once the user performs the selection, the selection is stored locally by the disposal unit and/or is transmitted for storage to a remote sample database. The user feedback can then be distributed to appropriate manufacturers, retailers, distributors, marketing agencies, and advertisers, as discussed in greater detail below.

The sampling process enables manufacturers, retailers, distributors, marketing agencies, and advertising entities to launch more effective marketing campaigns because the user will be automatically prompted to order or confirm the order of a sampled item. This may result in higher conversion rates, wherein the user orders a regular version of a sampled product, as compared to the success rates achieved by conventional sampling, advertisements, shelf-presence in a supermarket, and the like.

In addition, the provisioning of samples is more focused and accurate as compared with many conventional techniques. The samples provided to a given user can be selected based on user profile information, including the user's order history, the user's preferences and selected preference modes, the user's household demographics, the user's address, and the like, that will help identify the right target customers for a given marketing campaign. As illustrated in FIG. 11, at state 1102 user account information, including user demographic information, sample opt-in information, sample preference and mode information, and past order history information, is received and stored in a database. At state 1104, the user account information is retrieved and the demographic information compared to target customer demographics for a given product or service. At state 1106, based on the comparison, the user's opt-in information, and sample preference information, target customers are selected to receive samples of the given product or service. In one embodiment, an SQL query is generated using the forgoing parameters, and is used to query the sample product database 7014 to determine what would be appropriate samples for the user. At state 1108, the samples and user addresses, and address labels are provided to a supplier, shipping and/or a logistics company, and the samples are delivered.

Advantageously, the sampling process provides detailed consumption and user impression feedback. FIG. 12 illustrates an example process of collecting and distributing sample feedback information. At state 1202, all or a portion of the users who received a sample for a given product or services are selected to review a survey request. The portion can optionally be limited to only include users who have scanned the sample as part of the discard process, indicating that the user may have used the sample. At state 1204, the survey is sent via the disposal unit 7002, email, regular mail, a web page, text messaging, or by phone to the users. At state 1206, the survey results are received. In addition or alternatively, the following information is provided:

The percent and number of households who ordered a given product after receiving a sample of the product
The percent and number of households who disposed of the sampled product in the disposal unit 7002 and did not order the product and/or activated the Discard key
The reasons households did not order the sampled product as provided during the discard process or in response to later provided survey.

At state 1208 the survey results are distributed to the appropriate manufacturers, retailers, distributors, marketing agencies, and/or advertisers.

FIG. 13A illustrates an example sample preference form that the user can access via a web site, email, or otherwise. The form can include a field wherein the user can agree to participate in the sampling process by entering the appropriate indicator character or activating a corresponding link. The form lists products and product types that the user can indicate the user will accept or will not accept free samples of. For example, as illustrated in FIG. 13, the user can indicate on the form that the user will not accept product samples containing certain food types such as pork, poultry, beef, fish, seafood, or will only accept certain types of food products, such as vegetarian, low fat, low sodium, or kosher food products.

One embodiment of the sampling process further includes a coupon process, wherein the user is provided with coupons that entitle the user to free products or samples, product price discounts, promotions (such as buy one product and get another product for free), and the like.

The waste processing and replenishment system operator, manufacturers, retailers, distributors, and/or advertisers can provide the user with the coupon in the form of a hardcopy coupon having a printed coupon barcode, using regular mail or with the delivery of an order. The coupon barcode can include a special barcode, including, for example, the UPC number system character #4 customized for eTrash Co.

The coupon can also be in the form of an electronic coupon or a textual coupon code that can be emailed to the user or provided to the user via a web site and which the user can print out. The coupon can also be transmitted to the user's disposal unit 7002 and displayed to the user and/or printed out by the unit 7002 or a connected computing device. Coupon information can be stored in a coupon database, as discussed above. The coupon database can include a coupon identifier, a start date, an end date, the number of times the coupon can be used, the number of times the coupon has been used, and the coupon value. By way of example, the coupon value can be expressed as a specific monetary value, a percent discount, free shipping, or a "Buy X get Y Free."

If the coupon is a hardcopy coupon or a printout of an electronic coupon, the user can enter and apply the coupon by scanning the coupon code using the disposal unit 7002 scanner. If the coupon is in the form of a textual coupon code, the user can type in the code using the disposal unit 7002's keyboard or touch screen keyboard. If the coupon is sent to and displayed using the disposal unit 7002, the coupon can be automatically applied to an eligible purchase.

The coupons can include various restrictions of use. For example, the coupon can be restricted to a single user or to a single use per household. The coupon can also be time limited. Optionally, "numbered barcodes" can be used, where each coupon has a unique barcode number. When the coupon is entered and applied, the use of the coupon is recorded in the coupon database and that specific barcode is "deactivated" to prevent further use of the coupon.

With respect to free sample product coupons, once the user scans or otherwise enters the coupon code, the waste processing system will receive the coupon code information. The system will then transmit instructions to fulfill of the sampling order, as well as address information, to a third-party logistics company or other fulfillment entity. Advantageously, the use of sample product coupons will increase the use of the sampling process. For example, a manufacturer can authorize the distribution of 10,000 coupons to selected consumers and then evaluate the conversion rate of how many people who received and/or used the sample subsequently ordered the product sampled. Based on the evaluation result, the manufacturer can elect to send out an additional number of sample product coupons to additional selected consumers and/or to generally distribute additional coupons to consumers at large.

Figure 13B:
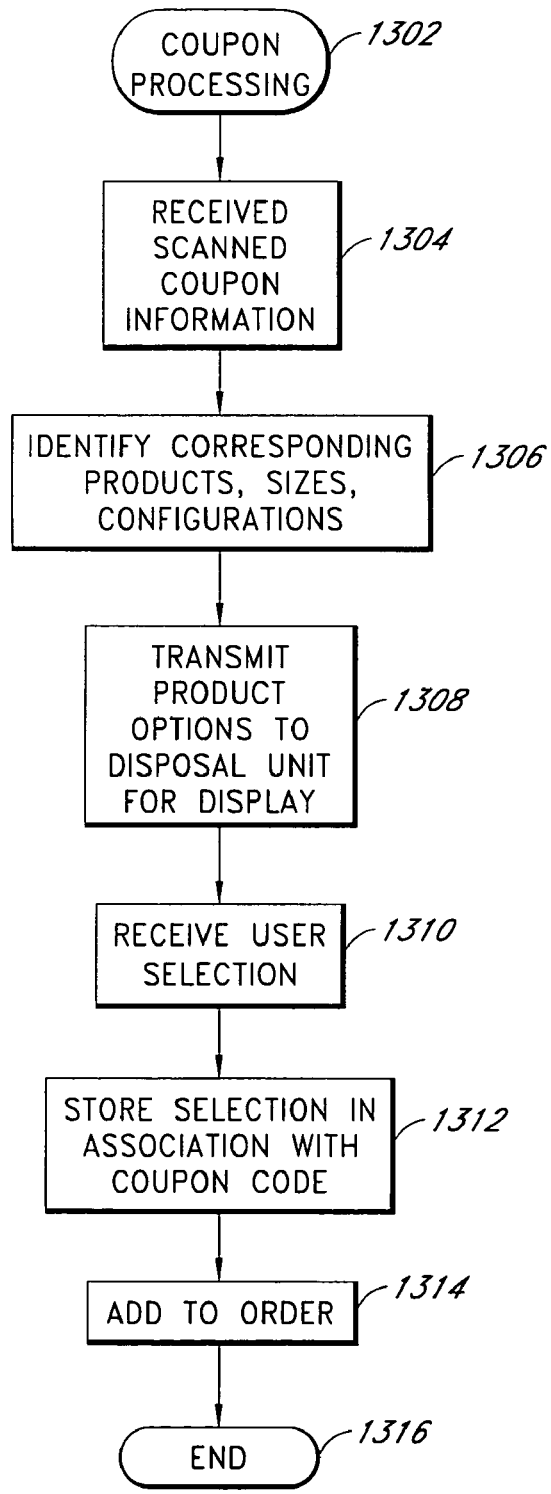
FIG. 13B illustrates an example coupon processing method.

FIG. 13B illustrates an example coupon processing method. The process begins at state 1302 and proceeds to state 1304. The user scans the coupon code using, for example, scanner 838 illustrated in FIG. 8B, and the scanned code is transmitted to the processing system 7005. The processing system 7005 uses the code to query the coupon database 7018 to identify which products the user has the option to use coupon in conjunction with, and the product sizes and configurations for which the coupon can be used. The processing system 7005 also verifies that the date falls within the coupon start and end dates. If applicable, the processing system further determines if the coupon can only be used a specified number of times, and if so determines whether or not the specified number has been exceeded. At state 1308, the options are transmitted to the disposal unit 7002 or computer terminal 7008 for display to the user.

At state 1310 the processing system receives the user selection of product size, configuration, and/or quantity. At state 1312 a notation that the coupon has been used is stored in the coupon database 7016 in association with the coupon code. Information regarding the use of the coupon can be provided to suppliers, retailers, research, and/or marketing firms who can use the information to perform a market analysis and/or to refine their product offerings. At state 1314 the user's order is stored in the order database 7012. At state 1316 the process ends.

With respect to discount coupons, once the user scans or otherwise enters the coupon code, the waste processing and replenishment system operator will receive the coupon code information and the discount will be applied to the user's pending order, assuming the order meets the conditions for the discount. In addition, there can be restrictions on the number of discount coupons that can be used for a given quantity of the applicable product in a given order.

In one embodiment, users are provided with the ability to change, restrict and create new buying habits by specifying corresponding order and delivery modes. Users can enable a modes option as part of their account setup. If the user enables the modes option, then the system will suggest alternative products to the user. By taking advantage of the automatic replenishment and the modes, users can beneficially alter their buying habits to thereby purchase healthier food, with little or no effort.

When providing alternative product recommendations, the selected modes guide and restrict automatic search filtering according to certain previously defined user substitution rules and restrictions, such as dietary preferences, for a replacement product similar to an item scanned and discarded. In addition, certain modes can alter delivery and order characteristics, such as when an order will be placed and/or delivery scheduled.

Figure 14:
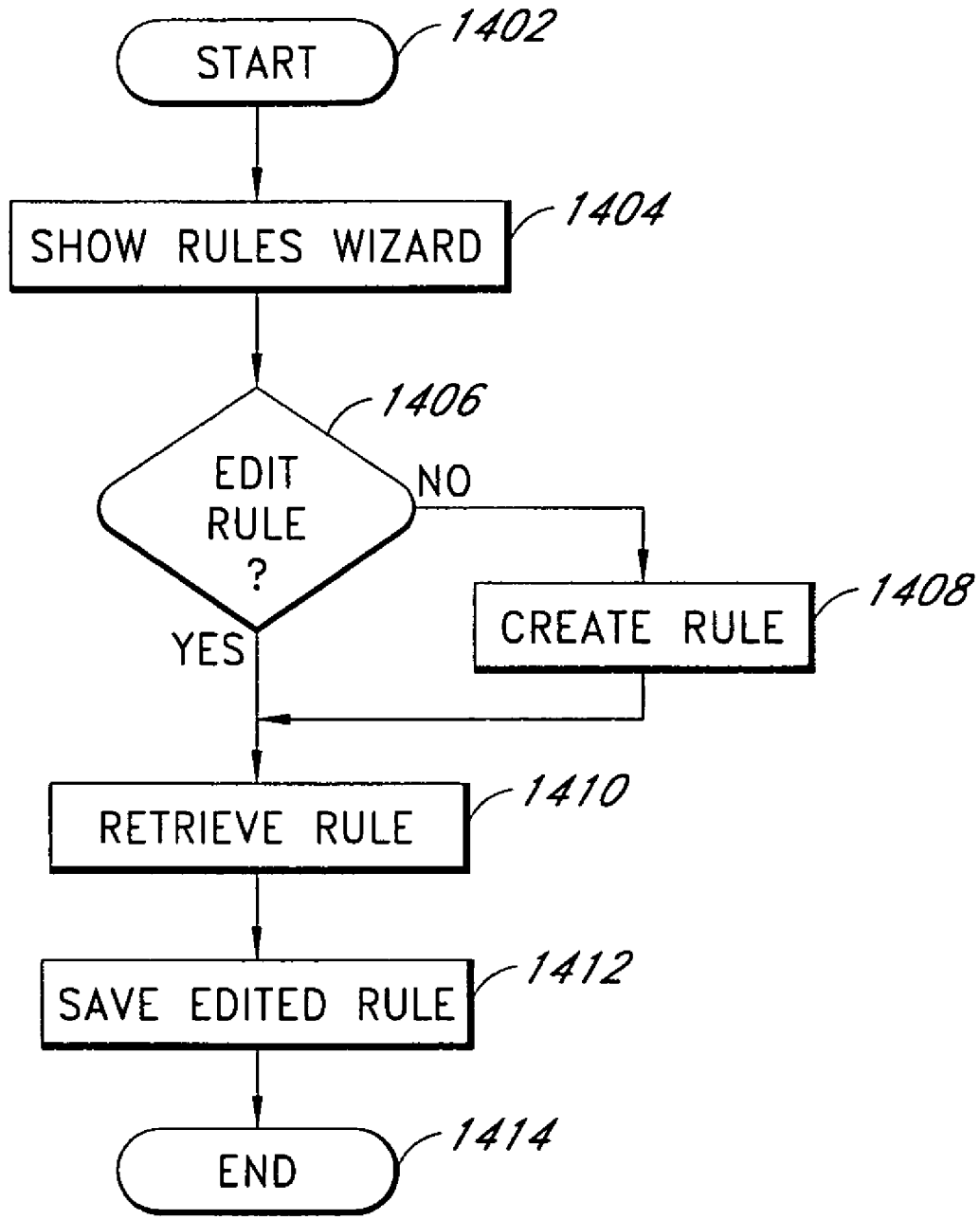
FIG. 14 illustrates an example mode rule creation/modification process.

Users can configure, revise, and review their mode rules and restrictions via the system operator web site or using the disposal unit 7002 user interface. These rules can be stored as part of the user's account information. FIG. 14 illustrates an example mode rule creation/modification process. At state 1402, the process proceeds to state 1404 where a rules wizard or form is provided. The user can use the wizard or form to create and add a new rule or to modify an existing rule to be applied to a user selected product category and/or sub-categories. Once a product category, and sub-categories if applicable, are selected, the user can choose from the corresponding modes menu. The following is one example modes menu:

Diet Mode
Fat-free Mode
Low-fat Mode
Gluten-Free Mode
Peanut-Free Mode
Salt-Free Mode
High-Protein Mode
Egg-Free Mode
Lactose-Free Mode
Non-dairy Mode
Kosher Mode
Organic Mode
Natural Mode
Social Mode
Popular Mode
Celebrity's Pick
Biodegradable Packaging Mode
Expert's Pick
Ecological Packaging Mode
M.D. (doctor recommended) Mode
Safe Mode A determination is made at state 1406 as to whether the user wants to edit an existing rule. If the user wants to edit an existing rule, the process proceeds to state 1410 where the rule to be edited is retrieved from the user account database, displayed, and edited by the user. If the user does not want edit an existing rule, the process proceeds from state 1406 to state 1408 and the wizard guides the user through the creation of a new rule. At state 1412 the new or edited rule is stored in the user's account record, and the process ends at state 1414.

When the user scans an item being disposed of, the user is queried via the display unit user interface whether or not the user is willing to change brand, product, family and and/or kind if the system is able to find a product similar to the one scanned that satisfies the user's specified or selected modes. By way of example the "brand" of a yogurt can be Dannon, the "product" would be yogurt, the "family" could be fat-free or low-fat, and the "kind" can be the flavor, such as strawberry. By way of further example, the "brand" of a razor can be Gillette, the "product" would be "razor", the "family" can be the product family, such as Mach3, and the "kind" can be the quantity per package, such as a 3 pack.

FIG. 15 illustrates an example add mode rule form. The mode rule form can be provided to the user as a web page on the user's computing device or via the disposal unit, by way of example. The user can select a particular product or product type from a product category field. The product category field can be a text entry field, wherein the user types in the product or product category, or it can be a menu including predefined products or product categories. The product category can be, for example, a food category, such as yogurt, bagel, cheeses, butter, cereal, salad dressing, pasta, snacks, soup, tea, coffee, fruit juices, cake mix, canned fruit, baby formula, or the like. The product category can be, a non-food category, such as dish soap, dishwasher detergent, hand soap, batteries, sandwich bags, aluminum foil, cling-wrap, coffee filters, water filters, trash bags, and the like.

A condition factor, such as "to be" "or "not to be" can be specified. A mode field is used to select from predefined preference modes, such as those discussed above, or using a user-defined preference mode. A flexibility field allows the user to specify an absolute or relative level of flexibility in accepting product substitution or recommendations of alternative products. For example, the user can specify a low level of flexibility to indicate the user is not willing to switch brand, type, family, and/or kind. The user can specify a high level of flexibility to indicate the user is willing to switch brand, type, family, and/or kind.

If the user checks or otherwise selects the mode selection "Restrictive" field box, then if a product that satisfies the rule is not found during a search for a substitute product, an alternative product will not be suggested to the user and/or an alternative product will not be automatically added to the user's order list.

If the user checks or otherwise selects the mode selection "Apply this rule to Sampling" field box, samples will be selected for the user that satisfy the selected mode rules.

If the user checks or otherwise selects the mode selection "Apply only this rule to this product category" field box, the system will disregard other rules that would otherwise be applied to the selected product category. If the selected mode has a rating associated with it then the rating method is selected via the rating method field. If the system finds more than one match for a scanned product, the user can specify via the rating method field that the product having the highest rating from one or more rating entities should be added to the user's order. For example, the ratings can be from reviewing entities, such as product review web sites or magazines that provide review. Alternatively or in addition, the ratings can be based on market data, such as product sales volumes, the system operator's or its employees' product preferences, and/or the preferences of one or more user-specified celebrities.

In addition, where the user has specified more than one mode for a given product or product type, the user can specify the mode priority, that is, the order in which mode filtering rule is to be applied. The user can modify the mode priorities by changing the priority numbering, or by dragging and dropping modes to form a list corresponding to the desired order of application.

Example user selectable modes will now be discussed in greater detail.

Diet Mode: the system searches for a diet or low calorie product similar to the one scanned, and that satisfies other rules and restrictions, if any, imposed by the user.

Fat-free/Low-fat Mode: the system searches for a fat-free or low-fat product similar to the one scanned, and that satisfies other rules and restrictions, if any, imposed by the user.

Kosher Mode: the system searches for a kosher product similar to the one scanned, and that satisfies other rules and restrictions, if any, imposed by the user.

Organic Mode: the system searches for an organic product, made or grown without the use of pesticides, similar to the one scanned, and that satisfies other rules and restrictions, if any, imposed by the user.

Natural Mode: the system searches for a natural product made without man-made ingredients similar to the one scanned, and that satisfies other rules and restrictions, if any, imposed by the user.

Popular Mode: the system searches for a product similar to the one scanned and that is the most popular brand based on quantity or dollar-value of sales, and that satisfies other rules and restrictions, if any, imposed by the user.

Celebrity's Pick: the system searches for a product similar to the one scanned, that has been identifies as a specified or selected celebrity's favorite product or brand, and satisfies other rules and restrictions, if any, imposed by the user. Optionally, the user can specify the celebrity. In addition, the waste processing and replenishment system operator can enter into agreements with celebrities for the celebrities to disclose their preferred products and which products they usually buy. Optionally, in exchange, manufacturers will pay marketing fees or provide other inducements, such as pay for the celebrity's grocery shopping for an agreed amount of time.

Biodegradable Packaging Mode: the system searches for a product similar to the one scanned, provided that it has biodegradable packaging and satisfies other rules and restrictions, if any, imposed by the user.

Expert's Pick: the system searches for a product similar to the one scanned, provided that it is an expert's favorite or recommended brand and satisfies other rules and restrictions, if any, imposed by the user. The expert can be associated with a specialized company, association, or magazine, such as a food or wine magazine, that reviews products of the type scanned. The expert can also be an aggregation of consumers' opinions. For example, the highest ranked product by certain consumers can be designated the expert's pick. Optionally, the user can select which expert should be used. The system operator can enter into an agreement with such experts and magazine to provide such picks or recommendation.

M.D. Mode: the system searches for a product similar to the one scanned, and that is compatible with a medical condition, such as diabetes, or heart disease, and that satisfies other rules and restrictions, if any, imposed by the user. For example, there may be dietary restrictions associated with certain medical conditions. The medical dietary restrictions can be configured and specified by the user's doctor or using dietary guidelines specified or endorsed by a respected medical association.

Safe Mode: the system restricts the purchase and/or selection of particular products or product categories—such as alcohol, cigarettes, over-the-counter drugs—selected by the user (i.e., parents can set-up an account for their children, but prevent their children from ordering alcohol or cigarettes). Additionally, the user can specify other restrictions, such restricting the selection of substitute items to those having a specified expiration date or later, or to those from or not from a specified country of origin.

Ecological Packaging Mode: the system searches for a product similar to the one scanned, that has packaging that is more ecologically safe or recyclable than the scanned product (i.e., Coca-Cola: change 12 oz. plastic bottle for 12 oz. Aluminum can; recycled paper packaging, recyclable paper packaging), and that satisfies other rules and restrictions, if any, imposed by the user.

1.—Social Mode: the system searches for a product similar to the scanned product, provided that the manufacturer's involvement with social causes coincides with, or at least partially with, the ones of interest to or specified by the user, and that the product satisfies other rules and restrictions imposed by the user. The user can specify which social causes the user wants taken into account (i.e., treatment of U.S. or foreign workers, fight hunger in Africa, fight against global warming, efforts preserve bio-diversity, recycling efforts, energy efficiency, corporate governance issues, and the like). Such information regarding the manufacturer can optionally be stored in a manufacturer database, such as manufacturer database 7015 described above. Advantageously, use of this mode can motivate companies to be more responsible socially, to thereby gain market share. Based on user preference reports provided by the waste processing and replenishment system operator, companies receiving such reports will know how many consumers may be willing to change their buying habits if the manufacturer is involved in resolving the specified social problems. Optionally, the user can enter a code via the unit's touch screen, keyboard, or the like that corresponds to a predefined desirable manufacturer characteristics. For example, the touch screen can include a soft social mode key for entering such a code, which can be an alphanumeric code. Upon activating the social mode key, an entry field is displayed for receiving the code. By way of illustration, an environmental organization can place an ad in a magazine explaining the problems that plastic packaging cause to the environment. The ad can provide a code that corresponds to a corresponding social mode, wherein products will be ordered from manufacturers that use ecological friendly packaging. For example, the ad can recite: "if you want to order products from manufacturers that use ecological friendly packaging, press the social mode key and enter "524", and your password, if needed, and this mode will be automatically added to your account."

Travel Mode: this mode is of particular use to travelers. When the Travel Mode is selected, the next automatic date of delivery is overridden by a user-specified date, such as the user's return date from a trip, for the delivery.

Other modes. Other pre-customized rules and restrictions from specialized organizations, such as those providing weight control programs or muscle building programs.

To better ensure customer satisfaction, users can instruct that the system provide confirmatory communications, such as via email, regular mail, a web site page, text messaging, instant messaging, phone calls or using other messaging techniques, that request that the user provide confirmation of proposed changes in product and orders triggered by selected modes. The user instruction can be provided using the user preference form.

FIG. 16 illustrates an example mode selection form 1600 for a plurality of product categories having user-specified prioritization. The example form includes a priority field, a product category field, a mode selected field, a restrictive field, a flexibility field, and a description field. The restrictive field is used to indicate whether the user wants to restrict the substitute or suggested alternative products or items to those that do not include a certain ingredient or do not have some other characteristic. The description field can be used to describe or specify the characteristic to be restricted via the restrictive field. By way of example, the description can list one or more ingredients that the user has restricted out, that is, will not accept in an alternative or substitute product.

FIG. 17 illustrates an example record for a product including product name, price, size, brand, type, family, and kind/flavor fields. Other fields, such as ingredients, calories, and/or specialty characteristics fields can be included as well. Thus, when searching for a substitute or suggested substitute, the system determines if the size, brand, type, family, and kind/flavor, and other characteristics of a potential substitute product corresponds to those acceptable by the user. If they do, then the product is a suitable substitute product or recommended substitute product, and the user is provided with the product name and price and/or the item is added to the user's order.

Figure 18:
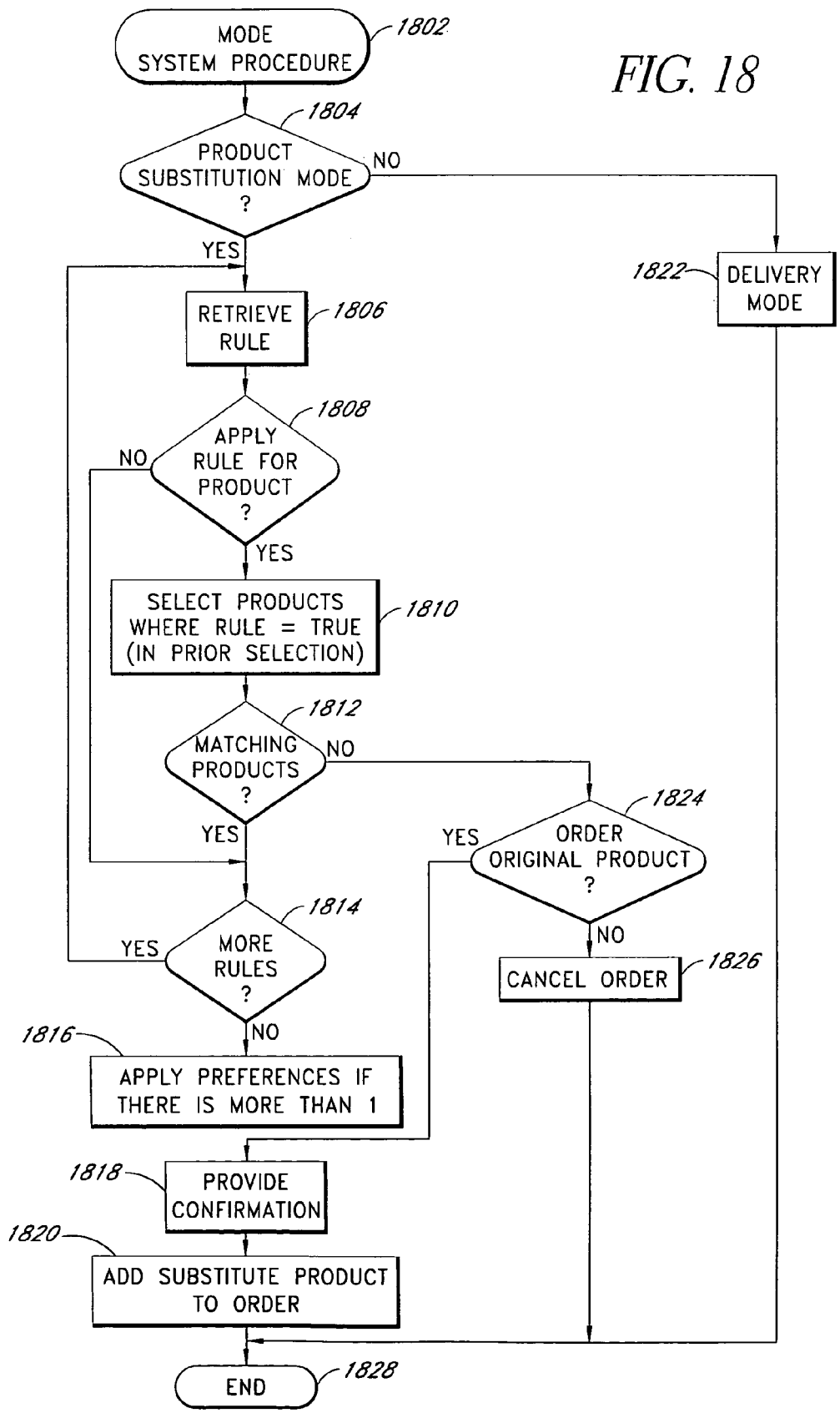
FIG. 18 illustrates an example mode application process.

FIG. 18 illustrates an example mode application process corresponding to Mode Substitution state 911 illustrated in FIG. 9. Beginning at state 1802, the process proceeds to state 1804, where the Modes Suggestion Option Flag and the Modes Substitution Option Flag are read from the user account database. If either of the flags are set, indicating that with respect to discarded items, the user wants the system to determine whether there is an appropriate substitute product which should be suggested to the user or automatically added to the user's order, the process proceeds to state 1806 and a first substitution modes rule is retrieved from the user account database. At state 1808 a determination is made as to whether the rule is applicable to the discard product category and/or sub-category. For example, the category can be yogurt, soda, coffee, cereal, salad dressing, meat, cleaner, toothpaste, soap, or light bulbs, and the corresponding subcategories can include strawberry yogurt, cola-type sodas, instant coffee, hot cereals, Italian salad dressing, beef meat, tile cleaner, children's toothpaste, soft soap, and fluorescent light bulbs. If the rule is not applicable, the process proceeds to state 1814. If the rule is applicable, the process proceeds to state 1810.

At state 1810 the product database is searched or queried to determine whether there are matching substitute products that satisfy the rule. If there are no matching substitute products, the process proceeds from state 1812 to state 1824 where the user is queried as to whether a replacement for the discarded product is to be included in the user's order. If the user answers no, the process proceeds to state 1826, where the process of adding the replacement product on the user's order is halted or cancelled, and the process proceeds to end state 1828. If the user answers yes, the process proceeds from state 1824 to state 1818.

Referring back to state 1812, if there is a matching substitute product, the process proceeds from state 1812 to state 1814. At state 1814 a determination is made as to whether the user has defined additional rules. If yes, the process proceeds back to state 1806, where the additional rules are applied to further filter or eliminate potential substitute products. Otherwise, the process proceeds to state 1816. If more than matching product was identified at state 1810, then at state 1816, user preferences are retrieved from the user account database in order to rank the identified substitute products according to which one more closely meets the user's preferences. In one embodiment, the least expensive matching product is designated as the top ranked product. The top ranked product is then selected as the alternative product.

If the User's Modes Substitution Option Flag is set, then at state 1818 a confirmation that the substitute is being added to the user's order is provided to the user via email, the disposal unit, or otherwise. If the user's Modes Suggestion Option Flag is set then the user will be asked if the user wants to accept the suggested substitution, and the user's response, enter via the disposal unit user interface or otherwise, is stored and acted on. At state 1820, the substitute product is added to the user's order, and the process ends at state 1828.

Referring back to state 1804, if neither the Modes Suggestion Option Flag nor the Modes Substitution Option Flag are set, then the process proceeds to state 1822, where the user's account data is read to determine if there are other modes set, such as the Travel Mode discussed above. If there are, then these modes are complied with and the process proceeds to end state 1828.

In addition, using the disposal unit content information, user order preferences, and the user's order history, inventory management and control can be performed with greater accuracy and more responsively. As discussed above, the disposal and replacement system stores information regarding products that are scanned and deposited in the disposal units. This information is then used to generate substantially real-time information on the corresponding households' product consumption. In addition, based on users order preferences, delivery preferences, and the disposal units' content information, information on the items consumed but not yet replenished, the disposal and replacement system can predict when replacement products will be or are likely to be ordered from suppliers for replenishment.

In particular, based on the content information, user profiles, and/or users pending orders, the disposal and replacement system creates or updates a database of consumed products yet to be replenished. For example, the database can be stored in disposal unit or in a remote data processing system, such as remote data processing system 7005. The database includes the identifiers for the products needing to be replenished, the product quantities, the expected date the product quantities will be needed, the zip code and/or regions where the products will be needed, and the retailer or distributor which will need the corresponding product quantities. This database can be queried using SQL queries or the like, by authorized retailers and manufacturers in accordance with the disposal and replacement system's rules and regulations of privacy. Alternatively or in addition, information regarding the types and quantities of goods needing replacement can be emailed or otherwise provided to selected retailers and suppliers without a query. Retailers and manufacturers optionally are not provided with competitor's information or specific order/household for a given user. For example, the order information for multiple users can be aggregated together and provided to a supplier without information that uniquely identifies an individual user.

In order to locate information of interest, retailers or manufactures can restrict their queries:

by zip code;
by region;
by product;
by date of delivery;
by quantity
by specified delivery date
by manufacturer and/or;
by retailers.

Manufactures, retailers, and suppliers can utilize the substantially real-time consumption information for sales forecasting and production planning, to improve efficiencies and logistics, to reduce working capital needs, and to evaluate product unit sales performance.

In particular, retailers can analyze the data retrieved from the database to forecast future sales and better plan purchases, reduce inventories, and manage partial fulfillment of orders. The queried information can be used by manufacturers to assess how successful a product launching campaign is by zip code, region, date, and the like. In addition, manufacturers can supply products to its regional distributors more efficiently according to the zip code or region where the goods were consumed. Manufacturers can further use the product consumption information for production planning purposes.

For example, when users have specified that orders are to be placed with a specific retailer or supplier, the specified retailer or supplier, knowing that the user's orders will be placed with them, can use advance knowledge of the pending user orders to keep in inventory the corresponding items and quantities on the order.

Many of the different entities involved in the order and supply chain process can be co-located within the same facility or hub to increase efficiencies and reduces costs. The different entities can include manufacturers, retailers and logistics companies that share warehouses and docks. Labor costs and general expenses will be shared between the parties as in a co-op. Manufacturers will have inventories leveled in accordance with sales forecasts and retailers can electronically purchase items as they select or bid on users' orders that they want to fulfill and as they actually fulfill orders.

Additionally, embodiments of the waste disposal and replacement system provide consumers with home inventory management. In particular, the waste disposal and replacement system analyzes the consumer's product consumption pattern for a certain or predetermined time and calculates the optimum inventory level for the household. Once this level is found, the system reminds or prompts consumers to purchase replacement items that have been completely consumed, or for items that the waste disposal and replacement system predict will be completely consumed within a predetermined amount of time based on past disposal history. The waste disposal and replacement system will also inform or advise the user not to buy overstocked until the household reaches an optimal or preferred inventory level.

Optionally, the waste processing and replenishment system operator takes steps to ensure customer's privacy. For example, one or more of the following techniques can be used: households or users are identified by only using an alphanumeric code; address information is only provided to the entity, such as a logistics company, that will deliver the order; communications with the disposal unit 7002 and/or the computing device can be encrypted; optionally retailers are only informed of the order content and the client identification alphanumeric code; and/or optionally the logistics company is only informed of the delivery address, and is not informed of the specific order contents.

If a user specified in the user's order preferences that orders are to be placed with a specific retailer or supplier, the system will receive user order and forward the order directly to that retailer or supplier. If the user specified that orders are to be placed with the retailer or supplier with the best overall order price, optionally including delivery charges, the orders are managed in accordance with the following example process.

In one embodiment, when the user specified that the lowest priced supplier be used to fill orders, once the system receives and stores the user order preferences, shipping preferences, and order, the system provides potential bidders, such as retailers or other suppliers, with the order information and the desired delivery date and/or shipping date. The bidders will then send their bids, including pricing information for the order and order delivery, back to the system. The system then compares and/or ranks the bids, and identifies the lowest priced bid, the next lowest priced bid, and so on. The order is then placed with the lowest cost provider who can meet or come within a predefined range of the desired delivery and/or shipping date.

Figure 19:
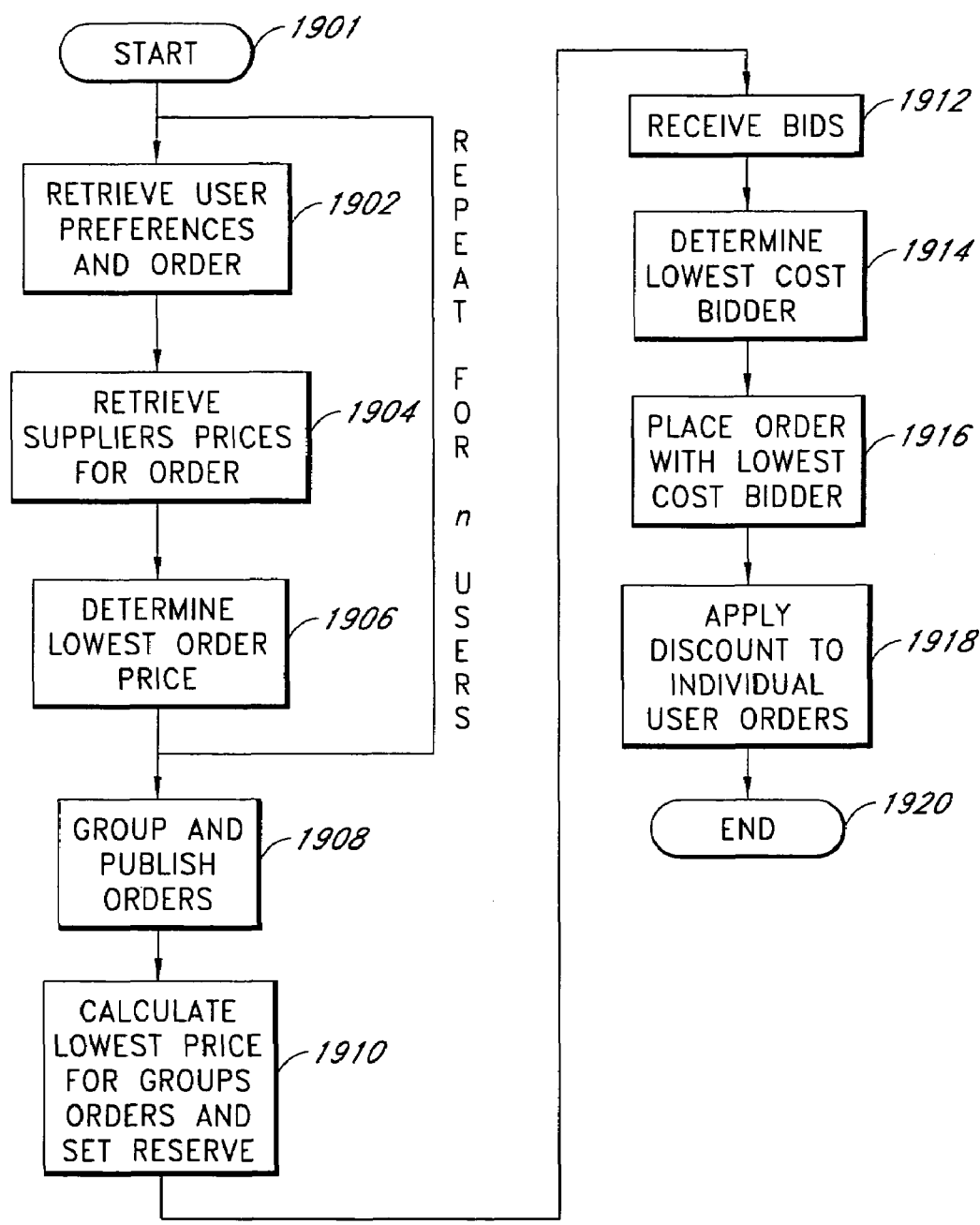
FIG. 19 illustrates an example bidding process.

FIG. 19 illustrates a bidding process that can be used if a user asked for the lowest priced supplier. Beginning at state 1901, the process proceed to state 1902, where the system retrieves the user's order preferences, shipping preferences, and order. At state 1904, the system accesses supplier databases, via the suppliers' web sites for example, using a web-bot or the like, and retrieves the suppliers' price for the items on the order. At state 1906, the lowest total price for the order is determined. This process is repeated for other users' orders placed during a predetermined period of time. At state 1908 the orders are grouped or aggregated and the groupings are "published" in a secure area of the system web site using, by way of example XML protocol, to be auctioned. The groupings can be based on requested delivery, order date, similarity or commonality of items being ordered, and/or geographical location. At state 1910 the previously determined lowest price for each of the users' orders in a given group are summed together.

At state 1912, suppliers, such as retailers, bid for each of the group of orders offering discounts as compared to their normal retail or wholesale prices. The reserve a given group is set to the previously calculated summed price for the group. That is, a successful bid needs to be lower than the summed price for the group. At state 1916 the lowest cost bidder is determined. At state 1916, when the auction ends, the orders for a given group will be forwarded to the best or lowest bidder. At state 1918, discounts are applied to orders proportionally to the overall discount of the bid for a given group. The process ends at state 1920.

If the retailer or supplier wants to bid on a user's orders, but is informed that the order includes items that are 'reserved,' that is, the user has specified that orders for certain items are to be placed with a specified different retailer or supplier, the retailer or supplier can decline to enter into the auction to supply the user's items.

The disposal unit described above can further be optionally used for voting. For example, the disposal unit touch screen can be used to present a ballot and receive votes on such items as the quality of a manufacturer or supplier, or on how socially responsible a manufacturer or supplier is. The votes can be collected, stored, and added, and the results of these votes can be used by users to select manufacturers and/or suppliers. Optionally, the user can be asked to provide a unique identifier, such as a password and/or a social security number, in order to vote.

The disposal unit can also optionally be used to request services by activating an appropriate soft button or otherwise provide a request. For example, a soft button corresponding to a baby sitter request can be provided. Similarly, a soft button can be provided to place an emergency call to the police, fire department, or ambulance service.

In addition, the barcode scanner can be used to scan barcodes on bills. The user can then enter a password and provide appropriate authorization, which is transmitted to the system by the disposal unit, and the bill is charged to a designated credit card, debit account, or other financial instrument.

It should be understood that certain variations and modifications of this invention would suggest themselves to one of ordinary skill in the art. The scope of the present invention is not to be limited by the illustrations or the foregoing descriptions thereof.

What is claimed is:

1. A disposal and provisioning system comprising:
   a waste disposal unit, the waste disposal unit including:
      a processor;
      a scanner couple to the processor, the scanner configured to scan a code on items deposited in the waste disposal unit;
      a network interface coupled to the processor, the network interface configured to transmit and receive information over a network; and
   a remote processing system configured to be coupled to the waste disposal unit via the network, the remote processing system including:
      a database storing sample preference associate with a user of the waste disposal unit, wherein the sample preferences are stored at least in part to select samples to be provided to the user;
      a first instruction configured to receive scanned information from the waste disposal unit for at least a first item;
      a second instruction configured to determine from the received scanned information that the first item is a sample;
      a third instruction configured to receive an indication via the waste disposal unit whether the user wants to order a replacement for the sample;
      a fourth instruction configured to locate replacement options for the sample;
      a fifth instruction configured to transmit the replacement options to the waste disposal unit;
      a sixth instruction configured to receive from the waste disposal unit an option selection by the user.

2. The waste disposal system as defined in claim 1, the remote processing system further comprising a seventh instruction configured to receive at least one of an indication via the waste disposal unit as to why the user does not want to order a replacement for the sample, or an indication via the waste disposal unit that the user wants to order a replacement for the sample.

3. The waste disposal system as defined in claim 1, the remote processing system further comprising a seventh instruction configured to provide the user with selectable reasons for not ordering a replacement for at least one sample.

4. The waste disposal system as defined in claim 1, the remote processing system further comprising:
   a seventh instruction configured to receive a reason for not ordering a replacement for at least one sample; and
   an eighth instruction configured to provide the reason to at least one of a manufacturer, retailer, distributor, marketing entity, or an advertiser.

5. The waste disposal system as defined in claim 1, the remote processing system further comprising a seventh instruction configured cause a non-sample replacement for the sample to be delivered to the user.

6. The waste disposal system as defined in claim 1, wherein the waste disposal unit further comprises a touch screen unit configured to display information to the user and to receive user inputs.

7. The waste disposal system as defined in claim 1, wherein the waste disposal unit further comprises a presence detection circuit that activates the scanner in response to detecting the presence of an object.

8. The waste disposal system as defined in claim 1, wherein the waste disposal unit further comprises a detachable display and user input apparatus coupled via a wireless network.

9. The waste disposal system as defined in claim 1, wherein the waste disposal unit is configured to request a user password before performing a scan.

10. The waste disposal system as defined in claim 1, wherein the scanner is one of a barcode scanner and a radio frequency scanner.

11. A method of selectively providing samples, comprising:
   receiving over a network user specified sample preferences from a user;
   storing the sample preferences in a user database;
   receiving from a networked waste receptacle discard information related to at least a first item package disposed of by the user;
   causing a first sample item to be delivered to the user based at least in part on the sample preferences and the discard information;
   receiving from a the networked waste receptacle discard information related to at least a first sample item package disposed of by the user;
   causing an order form for a regular version of the first sample item to be presented to the user;
   receiving an indication from the w that the user does not want to order a regular version of the first sample item; and
   requesting that the user provide a reason for not wanting to order a regular version of the first sample item.

12. The method as defined in claim 11, further comprising offering the user selectable reasons for not ordering the regular version of the first sample item.

13. The method as defined in claim 12, wherein the user selectable reasons include at least two or more of:
   the user does not use the first sample item-type;
   the user used the sample item but did not like it; and
   the user used and like the sample item, but prefers another brand.

14. A method of selectively providing samples, comprising:
receiving user specified sample preferences 6 um a first user over a network;
storing the preferences in a database;
causing a first sample that satisfies the user specified sample preferences to be delivered to the first user;
receiving coupon information via a waste disposal unit; and
causing an item corresponding to the coupon to be delivered to the first user.

15. The method as defined in claim 14, further comprising receiving an indication that the first sample has been used from a waste disposal unit.

16. The method as defined in claim 14, further comprising:
receiving an indication that at least packaging for the first sample has been deposited in a disposal unit;
causing a query to be presented via the disposal unit to the first user in order to determine if the first user wants to order a non-sample version of the first sample; and
receiving a response to the query.

17. The method as defined in claim 16, further comprising causing at least one query to be presented to the first user in order to determine at least one of a size or a quantity of the non-sample version that the first user wants.

18. The method as defined in claim 14, further comprising receiving information scanned from the first sample by the first user using a scanner coupled to a waste disposal unit.

19. The method-as defined in claim 14, further comprising:
receiving demographic information and sample preferences associated with a second user, and
causing samples that correspond to the user sample preferences and demographics to be delivered to the second user.

20. The method as defined in claim 14, further comprising determining at least one of a percent or a number of users that ordered a non-sample version of the first sample after receiving a sample of the product.

21. The method as defined h claim 14, further comprising determining at least one of a percent or a number of users that disposed of the first sample and did not order a non-sample version.

22. A method of selectively providing samples, comprising:
receiving user specified sample preferences from a first user over a network;
storing the preferences in a database;
causing a first sample that satisfies the user specified sample preferences to be delivered to the first user;
receiving an indication that at least packaging for the first sample has been deposited in a disposal unit;
causing a query to be presented to the first user in order to determine if the first user wants to order a non-sample version of the first sample;
receiving a negative response to the query;
causing a query to be presented to the first user in order to determine why first the first user did not want to order a non-sample version of the first sample;
receiving a response from the first user including at least a first reason from the first user indicating why the first user did not want to order a non-sample version of the first sample; and
providing information related to the response to at least one of a manufacturer, a retailer, a distributor, a marketing entity, or an advertiser.

23. A disposal data processing and provisioning system, comprising:
a database storing sample preferences associated with a user of at least a first waste disposal unit;
a processing system configured to be coupled to at least the first waste disposal unit via the network, the processing system including:
a first instruction stored in computer readable memory configured to receive information from the waste disposal unit for at least a first item;
a second instruction stored in computer readable memory configured to determine from the received scanned information that the first item is a sample; and
a third instruction stored in computer readable memory configured to receive an indication via the waste disposal unit whether the user wants to order a non-sample version for the first item;
a fourth instruction stored in computer readable memory configured to locate replacement options for the first item;
a fifth instruction stored in computer readable memory configured to transmit the replacement options to the first waste disposal unit; and
a sixth instruction stored in computer readable memory configured to receive from the waste disposal unit an option selection by the user.

24. A disposal data processing and provisioning system, comprising:
a database storing sample preferences associated with a user of at least a first waste disposal unit;
a processing system configured to be coupled to at least the fist waste disposal unit via the network, the processing system including:
a first instruction stored in computer readable memory configured to receive information from the waste disposal unit for at least a first item;
a second instruction stored in computer readable memory configured to determine from the received scanned information that the first item is a sample;
a third instruction stored in computer readable memory configured to receive an indication via the waste disposal unit whether the user wants to order a non-sample version for the first item; and
a fourth instruction stored in computer readable memory configured do receive an indication via the waste disposal unit as to why the user does not want to order a non-sample version for the first item, or an indication via the waste disposal unit that the user wants to order a non-sample version for the first item.

25. A disposal data processing and provisioning system, comprising:
a database storing sample preferences associated with a user of at least a first waste disposal unit;
a processing system configured to be coupled to at least the first waste disposal unit via the network, the processing system including:
a first instruction stored in computer readable memory configured to receive information from the waste disposal unit for at least a first item;
a second instruction stored in computer readable memory configured to determine from the received scanned information that the first item is a sample;
a third instruction stored in computer readable memory configured to receive an indication via the waste disposal unit whether the user wants to order a non-sample version for the first item; and a fourth instruction stored in computer readable memory that causes selectable reasons for not ordering a non-sample version for the first item to be presented to the user via the waste disposal unit.

26. A disposal data processing and provisioning system, comprising:

a database storing sample preferences associated with a user of at least a first waste disposal unit;

a processing system configured to be coupled to at least the first waste disposal unit via the network, the processing system including:

a first instruction stored in computer readable memory configured to receive information from the waste disposal unit for at least a first item;

a second instruction stored in computer readable memory configured to determine from the received scanned information that the first item is a sample; and a third instruction stored in computer readable memory configured to receive an indication via the waste disposal unit whether the user wants to order a non-sample version for the first item;

a fourth instruction stored in computer readable memory configured to process a reason for not ordering a non-sample version for the first item; and an fifth instruction stored in computer readable memory configured to provide the reason to at least one of a manufacturer, a retailer, a distributor, a marketing entity, or an advertiser.

27. A disposal data processing and provisioning system, comprising:

a database storing sample preferences associated with a user of at least a first waste disposal unit;

a processing system configured to be coupled to at least the h t waste disposal unit via the network, the processing system including:

a first instruction stored in computer readable memory configured to receive information from the waste disposal unit for at least a first item;

a second instruction stored in computer readable memory configured to determine from the received scanned information that the first item is a sample;

a third instruction stored in computer readable memory configured to receive an indication via the waste disposal unit whether the user wants to order a non-sample version for the first item; and a fourth instruction configured cause a non-sample replacement for the first item to be delivered to the user.

28. A method of selectively providing samples, comprising:

receiving over a network user specified sample preferences from a user, storing the sample preferences in a user database;

receiving from a networked waste receptacle discard information related to at least a first item package disposed of by the user, and causing a h t sample to be delivered to the user based at least in part on the sample preferences and the discard information;

receiving from the networked waste receptacle discard information related to at least a first sample item package disposed of by the user, causing an order form for a regular version of the first sample item to be presented to the user;

receiving an indication from the user that the user does not want to order a regular version of the sample item; and requesting that the user provide a reason for not wanting to order a regular version of the first sample item.

29. The method as defined in claim 28, further comprising offering the user selectable reasons for not ordering the regular version of the first sample item.

30. The method as defined in claim 29, wherein the user selectable reasons include at least two or more of the user does not use the first sample item-type; the user used the first sample item but did not like it; and the user used and like the first sample item, but prefers another brand.

31. A provisioning system, comprising: a scanning system, including:

a processor, a scanner coupled to the processor, the scanner configured to scan a code on items; a network interface coupled to the processor, the network interface configured to transmit and receive information over a network;

a presence detection circuit that activates the scanner in response to detecting the presence of an object; and a processing system configured to be coupled to the scanning system via the network, the processing system including: a database storing sample preferences associated with a user of the taming system, wherein the sample preferences are stored at-least in part to select samples to be provided to the user, instructions stored in computer readable memory configured to:

receive scanned information from the scanning system for at least a first item;

determine from the received scanned information that the first item is a sample;

receive an indication via the scanning system whether the user wants to order a replacement for the sample; locate replacement options for the sample;

transmit the replacement options to the scanning system;

receive from the scanning system an option selection by the user.

32. The provisioning system as defined in claim 31, the remote processing system further comprising an instruction stored in computer readable memory configured to receive an indication via the scanning system as to why the user does not want to order a replacement for the sample, or an indication via the scanning system that the user wants to order a replacement for the sample.

33. The provisioning system as defined in claim 31, the instructions further configured to cause a non-sample replacement for the sample to be delivered to the user.

34. The provisioning system as defined in claim 31, wherein the scanning system further comprises a touch screen unit configured to display information to the user and to receive user inputs.

35. The provisioning system as defined in claim 31, wherein the scanner includes at least one of a barcode scanner or a radio frequency scanner.

36. A provisioning system, comprising: a scanning system, including:

a processor;

a scanner coupled to the processor, the scanner configured to scan a code on items;

a network interface coupled to the processor, the network interface configured to transmit and receive information over a network;

a processing system configured to be coupled to the scanning system via the network, the processing system including:
  a database storing sample preferences associated with a user of the scanning system, wherein the sample preferences are stored at least in part to select samples to be provided to the user;
  instructions stored in computer readable memory configured to:
    receive scanned information from the scanning system for at least a first item;
    determine from the received scanned information that the first item is a sample;
    receive an indication via the scanning system whether the user wants to order a replacement for the sample;
    locate replacement options for the sample;
    transmit the replacement options to the scanning system;
    receive from the scanning system an option selection by the user, and the instructions further configured to provide the user with selectable reasons for not ordering a replacement for at least one sample.

37. A provisioning system, comprising:
a scanning system, including:
  a processor,
  a scanner coupled to the processor, the scanner configured to scan a code on, items;
  a network interface coupled to the processor, the network interface configured to transmit and receive information over a network;
  a processing system configured to be coupled to the scanning system via the network, the processing system including:
    a database storing sample preferences associated with a user of the scanning system, wherein the sample preferences are stored at least in part to select samples to be provided to the user;
    instructions stored in computer readable memory configured to:
      receive scanned information from the scanning system for at least a first item;
      determine from the received scanned information that the first item is a sample;
      receive an indication via the scanning system whether the user wants to order a replacement for the sample;
      locate replacement options for the sample;
      transmit the replacement options to the scanning system;
      receive from the scanning system an option selection by the user;
      the instructions further configured to:
        receive a reason for not ordering a replacement for at least one sample, and provide the reason to one or more of a manufacturer, retailer, distributor, marketing entity, or an adviser.

38. A provisioning system, comprising:
a scanning system, including:
  a processor;
  a scanner coupled to the processor, the scanner configured to scan a code on items;
  a network interface coupled to the processor, the network interface configured to transmit and receive information over a network;
  a processing system configured to be coupled to the scanning system via the network, the processing system including:
    a database storing sample preferences associated with a user of the scanning system, wherein the sample preferences are stored at least in part to select samples to be provided to the user, and
  instructions stored in computer readable memory configured to:
    receive scanned indication from the scanning system for at least a first item;
    determine from the received scanned information that the first item is a sample;
    receive an indication via the scanning system whether the user wants to order a replacement for the sample;
    locate replacement options for the sample;
    transmit the replacement options to the scanning system;
    receive from the scanning system an option selection by the user;
  wherein the seaming system further comprises a detachable display and user input apparatus coupled to the processor via a wireless network.

39. A provisioning system, comprising: a scanning system, including:
  a processor;
  a scanner coupled to the processor, the scanner configured to scan a code on items;
  a network interface coupled to the processor, the network interface, configured to transmit and receive information over a network,
  a processing system configured to be coupled to the scanning system via the network, the processing system including:
  a database storing sample preferences associated with a user of the scanning system, wherein the sample preferences are stored at least in part to select samples to be provided to the user; and
  instructions stored in computer readable memory configured to:
    receive scanned information from the scanning system for at least a first item;
    determine from the received scanned information that the first item is a sample;
    receive an indication via the scanning system whether the user wants to order a replacement for the sample;
    locate replacement options for the sample;
    transmit the replacement options to the scanning system;
    receive from the scanning system an option selection by the user;
    wherein the scanning system is configured to request a user password before performing a scan.

40. A method of selectively providing samples, comprising:
  receiving over a network user specified sample preferences from a first user;
  storing the sample preferences in a user database;
  receiving information scanned from a first item package by the first user,
  causing a first sample to be delivered to the first user based at least in part on the sample preferences and the scanned information;
  receiving information related to a first sample, item package scanned by the first user;
  causing an order form for a regular version of the first sample item to be presented to the first user on a display; and receiving over the network an order from the first user for the non-sample version of the first sample item.

41. A method of selectively providing samples, comprising:
   receiving over a network user specified sample preferences from a first user;
   storing the sample preferences in a user database;
   receiving information scanned from a first item package by the first user;
   causing a first sample item to be delivered to the first user based at least in part on the sample preferences and the scanned information;
   receiving information related to a first sample item package scanned by the first user;
   causing an order form for a regular version of the first sample item to be presented to the first user on a display; and
   receiving over the network an indication from the first user that the user does not want to order a regular version of the first sample item; and
   transmitting over the network a request to the user that the a user provide a reason for not wanting to order a regular version of the first sample item.

42. A method of selectively providing samples, comprising:
   receiving over a network user specified sample preferences from a first user;
   storing the sample preferences in a user database;
   receiving information scanned h m a first item package by the first user;
   causing a first sample to be delivered to the first user based at least in part on the sample preferences and the scanned information; and
   presenting to the first user selectable reasons for not ordering the regular version, of the first sample item.

43. The method as defined in claim 42, wherein the user selectable reasons include at least two or more of:
   the first user does not use the first sample item-type;
   the first user used the first sample item but did not like it; and
   the first user used and like the sample item, but prefers another brand.

44. A data processing and provisioning system, comprising:
   a database storing sample preferences associated with a user; and
   a processing system configured to be coupled to scanner, the processing system including instructions stored in computer readable memory configured to:
      receive information from the scanner for at least a first item;
      determine from the received scanned information that the first item is a sample;
      receive an indication over a network as to whether the user wants to order a non-sample version for the first item;
      receive information scanned from a bill by the scanner;
      receive an instruction from the user regarding paying the bill; and
      cause the bill to be paid.

45. The data processing and provisioning system as defined in claim 44, wherein the instructions are further configured to:
   locate replacement options for the first item;
   transmit the replacement options to a user accessible display, and
   receive a replacement option selection by the user.

46. The data processing and provisioning system as defined in claim 44, wherein the instructions are further configured to cause a non-sample replacement for the first item to be delivered to the user.

47. A data processing and provisioning system, comprising:
   a database storing sample preferences associated with a user; and
   a processing system configured to be coupled to scanner, the processing system including instructions stored in computer readable memory configured to:
      receive information h m the scanner for at least a first item;
      determine h the received scanned information that the first item is a sample;
      receive an indication over a network as to whether the user wants to order a non-sample version for the first item;
      receive an indication as to why the user does not want to order a non-sample version for the first item, or an indication that the user wants to order a non-sample version for the first item.

48. A data processing and provisioning system, comprising:
   a database storing sample preferences associated with a user, and
   a processing system configured to be coupled to scanner, the processing system including instructions stored in computer readable memory configured to:
      receive information from the scanner for at least a first item;
      determine from the received scanned information that the first item is a sample;
      receive an indication over a network as to whether the user wants to order a non-sample version for the first item;
      cause selectable reasons for not ordering a non-sample version for the first item to be presented to the user.

49. A data processing and provisioning system, comprising:
   a database storing sample preferences associated with a user, and
   a processing system configured to be coupled to scanner, the processing system including instructions stored in computer readable memory configured to:
      receive information from the scanner for at least a first item;
      determine from the received scanned information that the first item is a sample;
      receive an indication over a network as to whether the user wants to order a non-sample version for the first item;
      process a reason for not ordering a non-sample version for the first item, and provide the reason to one or more of a manufacturer, a retailer, a distributor, a marketing entity, or an advertiser.

50. A method of selectively providing samples, comprising:
   receiving over a network user specified sample preferences from a first user;
   storing the sample preferences in a user database;
   receiving over the network identification information related to at least a first item package scanned by the first user;
   causing a first sample item to be delivered to the &t user based at least in part on the sample preferences and the scanned information;

receiving scanned information related to at least a first sample item package;

causing an order form for a regular version of the first sample item to be presented to the first user on a display based at least in part. on the scanned information;

receiving an indication from the first user that the user does not want to order a regular version of the first sample item; and transmitting over the network a request that the user provide a reason for not wanting to order a regular version of the first sample item.

51. The method as defined in claim 50, further comprising offering the user selectable reasons for not ordering the regular version of the first sample item.

52. The method as defined in claim 51, wherein the user selectable reasons include at least two or more of:

the first user does not use the first sample item-type;
the first user used the sample item but did not like it;
the first user used and like the first sample item, but prefers another brand.

53. A method of selectively providing samples, comprising:

receiving over a network user specified sample preferences from a first user;

storing the sample preferences in user database;

receiving over the network identification information related to at least a first item package scanned by the user;

causing a first sample to be delivered to the user based at least in part on the sample preferences and the scanned information;

receiving information scanned from a bill by the user;

receiving and instruction from the user regarding paying the bill; and causing the bill to be paid.

54. The method as defined in claim 53, further comprising:

receiving scanned information related to at least a sample item package;

causing an order form for a regular version of the sample to be presented to the user on a display based at least in part on the scanned information; and receiving over the network an order b m the user for the non-sample version of the item sample.

* * * * *